(12) United States Patent
Yin et al.

(10) Patent No.: US 10,567,103 B2
(45) Date of Patent: Feb. 18, 2020

(54) DATA TRANSMISSION METHOD AND DEVICE

(71) Applicant: HUAWEI TECHNOLOGIES CO., LTD., Shenzhen (CN)

(72) Inventors: Jian Yin, Wuhan (CN); Jinqiu Liao, Chengdu (CN); Xin Xiao, Shenzhen (CN); Chao Liu, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/877,401

(22) Filed: Jan. 23, 2018

(65) Prior Publication Data

US 2018/0145782 A1 May 24, 2018

Related U.S. Application Data

(63) Continuation of application No. PCT/CN2016/087497, filed on Jun. 28, 2016.

(30) Foreign Application Priority Data

Jul. 23, 2015 (CN) .......................... 2015 1 0439629

(51) Int. Cl.
*H04J 3/16* (2006.01)
*H04B 7/26* (2006.01)
*H04L 25/49* (2006.01)

(52) U.S. Cl.
CPC .............. *H04J 3/1617* (2013.01); *H04B 7/26* (2013.01); *H04J 3/1652* (2013.01);
(Continued)

(58) Field of Classification Search
CPC ........ H04B 7/26; H04J 3/1617; H04J 3/1652; H04J 2203/0091; H04J 2203/0089; H04L 25/4908
See application file for complete search history.

(56) References Cited

U.S. PATENT DOCUMENTS

2002/0018474 A1    2/2002  Assa et al.
2007/0091896 A1*   4/2007  Liu ....................... H04J 3/1617
                                                          370/395.5
(Continued)

FOREIGN PATENT DOCUMENTS

CN       101155016 A      4/2008
CN        10133050 A     12/2008
(Continued)

OTHER PUBLICATIONS

CPRI Specification V6.1, Common Public Radio interface (CPRI);Interface Specification, Jul. 1, 2014, 129 pages.

*Primary Examiner* — Brian D Nguyen
(74) *Attorney, Agent, or Firm* — Kilpatrick Townsend & Stockton LLP

(57) ABSTRACT

Embodiments of the present disclosure provide a data transmission method and a device, and the method includes: determining synchronization header indication information indicating a frame header location of a first code stream, where the first code stream is obtained by encoding CPRI service data; decoding the first code stream to obtain a second code stream, where the first code stream is a 10B code stream, and the second code stream is an 8B code stream, or the first code stream is a 66B code stream, and the second code stream is a 64B code stream; inserting frame header indication information indicating a frame header location of the second code stream into the second code stream according to the synchronization header indication information; and mapping the second code stream and the frame header indication information into an OPU in an ODU frame.

23 Claims, 11 Drawing Sheets

(52) U.S. Cl.
CPC .. *H04L 25/4908* (2013.01); *H04J 2203/0089* (2013.01); *H04J 2203/0091* (2013.01)

(56) References Cited

U.S. PATENT DOCUMENTS

| | | | | |
|---|---|---|---|---|
| 2007/0116046 A1* | 5/2007 | Liu | ................. | H04J 3/1617 370/466 |
| 2007/0177552 A1* | 8/2007 | Wu | ................. | H04W 88/08 370/335 |
| 2007/0195832 A1* | 8/2007 | Liu | ................. | H04J 3/1617 370/539 |
| 2008/0199183 A1* | 8/2008 | Liu | ................. | H04J 3/1617 398/103 |
| 2010/0091794 A1 | 4/2010 | Jiang | | |
| 2010/0221005 A1 | 9/2010 | Zhao | | |
| 2011/0075683 A1* | 3/2011 | McClellan | ............ | H04L 1/0041 370/474 |
| 2014/0031049 A1* | 1/2014 | Sundaresan | ........... | H04W 16/02 455/447 |
| 2015/0180575 A1 | 6/2015 | Bruckman | | |
| 2015/0180626 A1* | 6/2015 | Hao | ................. | H04L 5/0044 370/329 |
| 2016/0013855 A1* | 1/2016 | Campos | ................. | H04B 7/12 370/343 |
| 2016/0050425 A1* | 2/2016 | Ho | ................. | H04N 19/40 375/240.02 |

FOREIGN PATENT DOCUMENTS

| | | |
|---|---|---|
| CN | 101692633 A | 4/2010 |
| CN | 101702642 A | 5/2010 |
| CN | 102025448 A | 4/2011 |
| CN | 102055974 A | 5/2011 |
| CN | 102118191 A | 7/2011 |
| EP | 2154833 A | 2/2010 |
| EP | 2209227 A1 | 7/2010 |
| WO | 2015092677 A1 | 6/2015 |

* cited by examiner

DATA TRANSMISSION METHOD AND DEVICE

CROSS-REFERENCE TO RELATED APPLICATIONS

This application is a continuation of International Application No. PCT/CN2016/087497, filed on Jun. 28, 2016, which claims priority to Chinese Patent Application No. 201510439629.0, filed on Jul. 23, 2015. The disclosures of the aforementioned applications are hereby incorporated by reference in their entireties.

TECHNICAL FIELD

Embodiments of the present disclosure relate to the field of communications technologies, and more specifically, to a data transmission method and a device.

BACKGROUND

With arrival of an intelligent era and an Internet of things era, a data bandwidth is greatly increased. A future radio access network needs to meet a requirement for a rapid bandwidth increase, and further needs to provide cheap wireless broadband Internet access for a user. The future radio access network needs to meet the following conditions: (1) reducing energy consumption and reducing capital expenditure and operating expenditure; (2) improving frequency spectrum efficiency and increasing a user bandwidth; (3) opening a platform and supporting multiple standards and smooth upgrade; and (4) providing a better Internet service for an end user.

Based on a centralized baseband processing pool, a cooperative wireless network that includes a remote radio frequency unit and an antenna, and a (Centralized/Cooperative/Cloud Radio Access Network (C-RAN) of a real-time cloud-type infrastructure of an open platform, a requirement for synchronous development between operator revenues and a future mobile Internet service can be met.

A fiber direct connection manner is used in a conventional communication method. However, because of a growing number of deployed Remote Radio Units (RRU), costs of this manner increase rapidly. Therefore, a solution is currently used. In this solution, an Optical Transport Network (OTN) device is disposed between an RRU and a Baseband Unit (BBU) to reduce deployment costs.

However, because 8B/10B (or 64B/66B) encoding is used in the existing solution, redundant overheads are caused after a Common Public Radio interface (CPRI) service is encoded. In the existing solution, the CPRI service is directly and transparently mapped into an Optical Transport Unit (OTU) frame for transmission. Therefore, the redundant overheads are mapped for transmission in this solution, thereby wasting transmission bandwidth resources, and resulting in low data transmission efficiency.

SUMMARY

Embodiments of the present disclosure provide a data transmission method and a device, so as to save transmission bandwidth, and improve data transmission efficiency.

According to a first aspect, a data transmission method is provided, including: determining synchronization header indication information indicating a frame header location of a first code stream, where the first code stream is obtained by encoding common public radio interface CPRI service data; decoding the first code stream to obtain a second code stream, where the first code stream is a 10B code stream, and the second code stream is an 8B code stream, or the first code stream is a 66B code stream, and the second code stream is a 64B code stream; inserting frame header indication information indicating a frame header location of the second code stream into the second code stream according to the synchronization header indication information; and mapping the second code stream and the frame header indication information into an optical channel payload unit OPU in an optical channel data unit ODU frame.

With reference to the first aspect, in a first possible implementation of the first aspect, the mapping the second code stream and the frame header indication information into an optical channel payload unit OPU in an optical channel data unit ODU frame includes: performing timeslot division on the OPU based on a minimum granularity bandwidth of the CPRI service data to obtain at least one OPU timeslot; and mapping the second code stream and the frame header indication information into the at least one OPU timeslot.

With reference to the first possible implementation of the first aspect, in a second possible implementation of the first aspect, a bandwidth of the OPU timeslot is greater than or equal to 492.48 M.

With reference to any one of the first aspect, or the first to the second possible implementations of the first aspect, in a third possible implementation of the first aspect, before the decoding the first code stream, the method further includes: periodically marking the synchronization header indication information at the frame header location of the first code stream.

With reference to the third possible implementation of the first aspect, in a fourth possible implementation of the first aspect, when the first code stream is a 10B code stream, and the second code stream is an 8B code stream, the periodically marking the synchronization header indication information at the frame header location of the first code stream includes: identifying a first code block with a character K28.5 in the first code stream; and marking a location of the first code block as first synchronization header indication information; and the inserting frame header indication information indicating a frame header location of the second code stream into the second code stream according to the synchronization header indication information includes: inserting the frame header indication information into the second code stream before the first synchronization header indication information according to the first synchronization header indication information in the first code stream.

With reference to the third possible implementation of the first aspect, in a fifth possible implementation of the first aspect, when the first code stream is a 66B code stream, and the second code stream is a 64B code stream, the periodically marking the synchronization header indication information at the frame header location of the first code stream includes: identifying a second code block with a character /S/ in the first code stream; and marking a location of the second code block as second synchronization header indication information; and the inserting frame header indication information indicating a frame header location of the second code stream into the second code stream according to the synchronization header indication information includes: inserting the frame header indication information into the second code stream before the second synchronization header indication information according to the second synchronization header indication information in the first code stream.

With reference to any one of the first aspect, or the first to the fifth possible implementations of the first aspect, in a sixth possible implementation of the first aspect, the method further includes: inserting an overhead byte and/or a reserved byte into the second code stream; and the mapping the second code stream and the frame header indication information into an optical channel payload unit OPU in an optical channel data unit ODU frame includes: mapping the second code stream, the frame header indication information, and the overhead byte and/or the reserved byte into the OPU in the ODU frame.

With reference to the first or the second possible implementation of the first aspect, in a seventh possible implementation of the first aspect, the at least one OPU timeslot corresponds to at least one piece of identification information, and the mapping the second code stream and the frame header indication information into the at least one OPU timeslot includes: determining first data corresponding to first identification information in the at least one piece of identification information in the second code stream and the frame header indication information according to the at least one piece of identification information; and mapping the first data into an OPU timeslot corresponding to the first identification information.

With reference to the seventh possible implementation of the first aspect, in an eighth possible implementation of the first aspect, the at least one piece of identification information is indicated based on an overhead byte in the ODU frame.

According to a second aspect, a data transmission method is provided, including: receiving an optical channel data unit ODU frame from an optical transport network OTN device; demapping an optical channel payload unit OPU in the ODU frame to obtain a second code stream and frame header indication information indicating a frame header location of the second code stream; and encoding the second code stream according to the frame header indication information to obtain a first code stream, where the first code stream is a 10B code stream, and the second code stream is an 8B code stream, or the first code stream is a 66B code stream, and the second code stream is a 64B code stream; and the first code stream is obtained by encoding common public radio interface CPRI service data.

With reference to the second aspect, in a first possible implementation of the second aspect, the OPU includes at least one OPU timeslot obtained by performing timeslot division based on a minimum granularity bandwidth of the CPRI service data.

With reference to the first possible implementation of the second aspect, in a second possible implementation of the second aspect, a bandwidth of the OPU timeslot is greater than or equal to 492.48 M.

With reference to the first or the second possible implementation of the second aspect, in a third possible implementation of the second aspect, the at least one OPU timeslot corresponds to at least one piece of identification information, and the demapping an optical channel payload unit OPU in the ODU frame to obtain a second code stream and frame header indication information indicating a frame header location of the second code stream includes: parsing an overhead byte in the ODU frame to obtain a correspondence between the at least one piece of identification information and corresponding data; and parsing an overhead byte of the OPU in the ODU frame, and obtaining the second code stream and the frame header indication information according to the correspondence.

With reference to the third possible implementation of the second aspect, in a fourth possible implementation of the second aspect, the at least one piece of identification information is indicated based on the overhead byte in the ODU frame.

With reference to any one of the second aspect, or the first to the fourth possible implementations of the second aspect, in a fifth possible implementation of the second aspect, before the encoding the second code stream according to the frame header indication information to obtain a first code stream, the method further includes: modifying, according to the frame header indication information, the frame header indication information into synchronization header indication information that is used to indicate a frame header location of the first code stream.

With reference to the fifth possible implementation of the second aspect, in a sixth possible implementation of the second aspect, when the first code stream is a 10B code stream, and the second code stream is an 8B code stream, the method further includes: modifying a character of the location indicated by the synchronization header indication information into K28.5 according to the synchronization header indication information.

With reference to the fifth possible implementation of the second aspect, in a seventh possible implementation of the second aspect, when the first code stream is a 66B code stream and the second code stream is a 64B code stream, the method further includes: modifying a character of the location indicated by the synchronization header indication information into /S/ according to the synchronization header indication information.

With reference to any one of the second aspect, or the first to the seventh possible implementations of the second aspect, in an eighth possible implementation of the second aspect, before the encoding the second code stream according to the frame header indication information to obtain a first code stream, the method further includes: identifying an overhead byte and/or a reserved byte in the second code stream according to the frame header indication information; and deleting the overhead byte and/or the reserved byte.

According to a third aspect, a device is provided, including: a determining unit, configured to determine synchronization header indication information indicating a frame header location of a first code stream, where the first code stream is obtained by encoding common public radio interface CPRI service data; a decoding unit, configured to decode the first code stream to obtain a second code stream, where the first code stream is a 10B code stream, and the second code stream is an 8B code stream, or the first code stream is a 66B code stream, and the second code stream is a 64B code stream; an insertion unit, configured to insert frame header indication information indicating a frame header location of the second code stream into the second code stream according to the synchronization header indication information; and a mapping unit, configured to map the second code stream and the frame header indication information into an optical channel payload unit OPU in an optical channel data unit ODU frame.

With reference to the third aspect, in a first possible implementation of the third aspect, the mapping unit is specifically configured to: perform timeslot division on the OPU based on a minimum granularity bandwidth of the CPRI service data to obtain at least one OPU timeslot; and map the second code stream and the frame header indication information into the at least one OPU timeslot.

With reference to the first possible implementation of the third aspect, in a second possible implementation of the third aspect, a bandwidth of the OPU timeslot is greater than or equal to 492.48 M.

With reference to any one of the third aspect, or the first to the second possible implementations of the third aspect, in a third possible implementation of the third aspect, the device further includes: a marking unit, configured to periodically mark the synchronization header indication information at the frame header location of the first code stream.

With reference to the third possible implementation of the third aspect, in a fourth possible implementation of the third aspect, when the first code stream is a 10B code stream, and the second code stream is an 8B code stream, the device further includes: an identification unit, configured to identify a first code block with a character K28.5 in the first code stream, where the marking unit is specifically configured to mark a location of the first code block as first synchronization header indication information; and the insertion unit is specifically configured to insert the frame header indication information into the second code stream before the first synchronization header indication information according to the first synchronization header indication information in the first code stream.

With reference to the third possible implementation of the third aspect, in a fifth possible implementation of the third aspect, when the first code stream is a 66B code stream, and the second code stream is a 64B code stream, the device further includes: an identification unit, configured to identify a second code block with a character /S/ in the first code stream, where the marking unit is specifically configured to mark a location of the second code block as second synchronization header indication information; and the insertion unit is specifically configured to insert the frame header indication information into the second code stream before the second synchronization header indication information according to the second synchronization header indication information in the first code stream.

With reference to any one of the third aspect, or the first to the fifth possible implementations of the third aspect, in a sixth possible implementation of the third aspect, the insertion unit is further configured to insert an overhead byte and/or a reserved byte into the second code stream; and the mapping unit is specifically configured to map the second code stream, the frame header indication information, and the overhead byte and/or the reserved byte into the OPU in the ODU frame.

With reference to the first or the second possible implementation of the third aspect, in a seventh possible implementation of the third aspect, the at least one OPU timeslot corresponds to at least one piece of identification information, and the mapping unit is specifically configured to: determine first data corresponding to first identification information in the at least one piece of identification information in the second code stream and the frame header indication information according to the at least one piece of identification information; and map the first data into an OPU timeslot corresponding to the first identification information.

With reference to the seventh possible implementation of the third aspect, in an eighth possible implementation of the third aspect, the at least one piece of identification information is indicated based on an overhead byte in the ODU frame.

According to a fourth aspect, a device is provided, including: a receiving unit, configured to receive an optical channel data unit ODU frame from an optical transport network OTN device; a demapping unit, configured to demap an optical channel payload unit OPU in the ODU frame to obtain a second code stream and frame header indication information indicating a frame header location of the second code stream; and an encoding unit, configured to encode the second code stream according to the frame header indication information to obtain a first code stream, where the first code stream is a 10B code stream, and the second code stream is an 8B code stream, or the first code stream is a 66B code stream, and the second code stream is a 64B code stream; and the first code stream is obtained by encoding common public radio interface CPRI service data.

With reference to the fourth aspect, in a first possible implementation of the fourth aspect, the OPU includes at least one OPU timeslot obtained by performing timeslot division based on a minimum granularity bandwidth of the CPRI service data.

With reference to the first possible implementation of the fourth aspect, in a second possible implementation of the fourth aspect, a bandwidth of the OPU timeslot is greater than or equal to 492.48 M.

With reference to the first or the second possible implementation of the fourth aspect, in a third possible implementation of the fourth aspect, the at least one OPU timeslot corresponds to at least one piece of identification information, and the demapping unit is specifically configured to: parse an overhead byte in the ODU frame to obtain a correspondence between the at least one piece of identification information and corresponding data; and parse an overhead byte of the OPU in the ODU frame, and obtain the second code stream and the frame header indication information according to the correspondence.

With reference to the third possible implementation of the fourth aspect, in a fourth possible implementation of the fourth aspect, the at least one piece of identification information is indicated based on the overhead byte in the ODU frame.

With reference to any one of the fourth aspect, or the first to the fourth possible implementations of the fourth aspect, in a fifth possible implementation of the fourth aspect, the device further includes: a modifying unit, configured to modify, according to the frame header indication information, the frame header indication information into synchronization header indication information that is used to indicate a frame header location of the first code stream.

With reference to the fifth possible implementation of the fourth aspect, in a sixth possible implementation of the fourth aspect, when the first code stream is a 10B code stream, and the second code stream is an 8B code stream, the modifying unit is further configured to modify a character of the location indicated by the synchronization header indication information into K28.5 according to the synchronization header indication information.

With reference to the fifth possible implementation of the fourth aspect, in a seventh possible implementation of the fourth aspect, when the first code stream is a 66B code stream, and the second code stream is a 64B code stream, the modifying unit is further configured to modify a character of the location indicated by the synchronization header indication information into /S/ according to the synchronization header indication information.

With reference to any one of the fourth aspect, or the first to the seventh possible implementations of the fourth aspect, in an eighth possible implementation of the fourth aspect, the device further includes: an identification unit, configured to identify an overhead byte and/or a reserved byte in the second code stream according to the frame header indication information; and a deletion unit, configured to delete the overhead byte and/or the reserved byte.

According to a fifth aspect, a device is provided, including: a processor, configured to: determine synchronization header indication information indicating a frame header location of a first code stream, where the first code stream is obtained by encoding common public radio interface CPRI service data; decode the first code stream to obtain a second code stream, where the first code stream is a 10B code stream, and the second code stream is an 8B code stream, or the first code stream is a 66B code stream, and the second code stream is a 64B code stream; insert frame header indication information indicating a frame header location of the second code stream into the second code stream according to the synchronization header indication information; and map the second code stream and the frame header indication information into an optical channel payload unit OPU in an optical channel data unit ODU frame.

With reference to the fifth aspect, in a first possible implementation of the fifth aspect, the processor is specifically configured to: perform timeslot division on the OPU based on a minimum granularity bandwidth of the CPRI service data to obtain at least one OPU timeslot; and map the second code stream and the frame header indication information into the at least one OPU timeslot.

With reference to the first possible implementation of the fifth aspect, in a second possible implementation of the fifth aspect, a bandwidth of the OPU timeslot is greater than or equal to 492.48 M.

With reference to any one of the fifth aspect, or the first to the second possible implementations of the fifth aspect, in a third possible implementation of the fifth aspect, the processor is further configured to periodically mark the synchronization header indication information at the frame header location of the first code stream.

With reference to the third possible implementation of the fifth aspect, in a fourth possible implementation of the fifth aspect, when the first code stream is a 10B code stream, and the second code stream is an 8B code stream, the processor is specifically configured to: identify a first code block with a character K28.5 in the first code stream; mark a location of the first code block as first synchronization header indication information; and insert the frame header indication information into the second code stream before the first synchronization header indication information according to the first synchronization header indication information in the first code stream.

With reference to the third possible implementation of the fifth aspect, in a fifth possible implementation of the fifth aspect, when the first code stream is a 66B code stream, and the second code stream is a 64B code stream, the processor is specifically configured to: identify a second code block with a character /S/ in the first code stream; mark a location of the second code block as second synchronization header indication information; and insert the frame header indication information into the second code stream before the second synchronization header indication information according to the second synchronization header indication information in the first code stream.

With reference to any one of the fifth aspect, or the first to the fifth possible implementations of the fifth aspect, in a sixth possible implementation of the fifth aspect, the processor is further configured to insert an overhead byte and/or a reserved byte into the second code stream; and the processor is specifically configured to map the second code stream, the frame header indication information, and the overhead byte and/or the reserved byte into the OPU in the ODU frame.

With reference to the first or the second possible implementation of the fifth aspect, in a seventh possible implementation of the fifth aspect, the at least one OPU timeslot corresponds to at least one piece of identification information, and the processor is specifically configured to: determine first data corresponding to first identification information in the at least one piece of identification information in the second code stream and the frame header indication information according to the at least one piece of identification information; and map the first data into an OPU timeslot corresponding to the first identification information.

With reference to the seventh possible implementation of the fifth aspect, in an eighth possible implementation of the fifth aspect, the at least one piece of identification information is indicated based on an overhead byte in the ODU frame.

According to a sixth aspect, a device is provided, including: a receiver circuit and a processor, where the receiver circuit is configured to receive an optical channel data unit ODU frame from an optical transport network OTN device; and the processor is configured to: demap an optical channel payload unit OPU in the ODU frame to obtain a second code stream and frame header indication information indicating a frame header location of the second code stream; and encode the second code stream according to the frame header indication information to obtain a first code stream, where the first code stream is a 10B code stream, and the second code stream is an 8B code stream, or the first code stream is a 66B code stream, and the second code stream is a 64B code stream; and the first code stream is obtained by encoding common public radio interface CPRI service data.

With reference to the sixth aspect, in a first possible implementation of the sixth aspect, the OPU includes at least one OPU timeslot obtained by performing timeslot division based on a minimum granularity bandwidth of the CPRI service data.

With reference to the first possible implementation of the sixth aspect, in a second possible implementation of the sixth aspect, a bandwidth of the OPU timeslot is greater than or equal to 492.48 M.

With reference to the first or the second possible implementation of the sixth aspect, in a third possible implementation of the sixth aspect, the at least one OPU timeslot corresponds to at least one piece of identification information, and the processor is specifically configured to: parse an overhead byte in the ODU frame to obtain a correspondence between the at least one piece of identification information and corresponding data; and parse an overhead byte of the OPU in the ODU frame, and obtain the second code stream and the frame header indication information according to the correspondence.

With reference to the third possible implementation of the sixth aspect, in a fourth possible implementation of the sixth aspect, the at least one piece of identification information is indicated based on the overhead byte in the ODU frame.

With reference to any one of the sixth aspect, or the first to the fourth possible implementations of the sixth aspect, in a fifth possible implementation of the sixth aspect, the processor is further configured to modify, according to the frame header indication information, the frame header indication information into synchronization header indication information that is used to indicate a frame header location of the first code stream.

With reference to the fifth possible implementation of the sixth aspect, in a sixth possible implementation of the sixth aspect, when the first code stream is a 10B code stream, and the second code stream is an 8B code stream, the processor is further configured to modify a character of the location indicated by the synchronization header indication information into K28.5 according to the synchronization header indication information.

With reference to the fifth possible implementation of the sixth aspect, in a seventh possible implementation of the sixth aspect, when the first code stream is a 66B code stream, and the second code stream is a 64B code stream, the processor is further configured to modify a character of the location indicated by the synchronization header indication information into /S/ according to the synchronization header indication information.

With reference to any one of the sixth aspect, or the first to the seventh possible implementations of the sixth aspect, in an eighth possible implementation of the sixth aspect, the processor is further configured to: identify an overhead byte and/or a reserved byte in the second code stream according to the frame header indication information; and delete the overhead byte and/or the reserved byte.

In the embodiments of the present disclosure, a 10B code stream/a 66B code stream obtained by encoding service data is decoded to respectively obtain an 8B code stream/a 64B code stream, and frame header indication information that is used to indicate a frame header location is inserted, so as to generate a self-defined frame that is transmitted by using 8B/64B code. Overheads are peeled off, and the self-defined frame is directly mapped into a payload area for transmission, thereby avoiding a prior-art problem that efficiency is relatively low because redundant overheads are mapped. Therefore, a transmission bandwidth can be saved, and data transmission efficiency can be improved in the embodiments of the present disclosure.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

Figure 1:
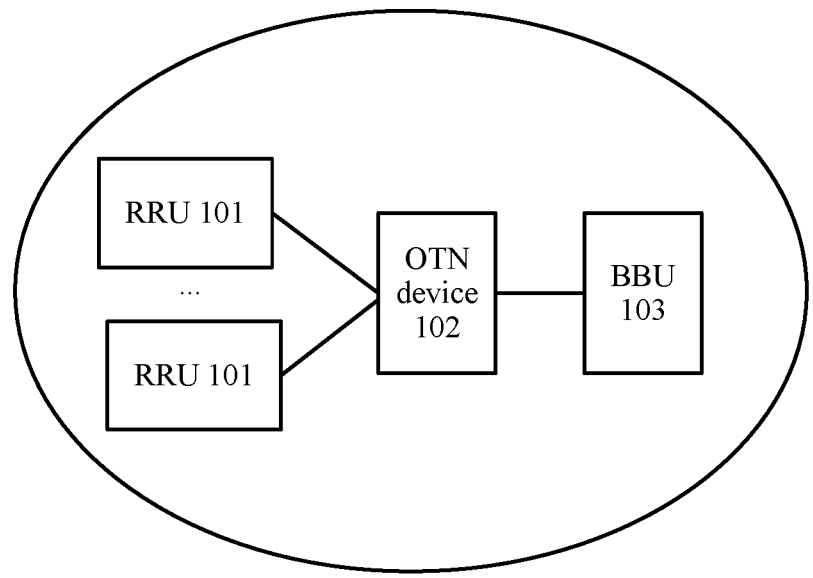
FIG. 1 is a schematic diagram of a network architecture.

FIG. 1 is a schematic diagram of a network architecture. As shown in FIG. 1, the network architecture includes at least one RRU 101, an OTN device 102, and a BBU 103.

Specifically, a CPRI service is used as an example. In an existing C-RAN solution, the CPRI service is directly and transparently mapped into an OTU frame for transmission, and content of the CPRI service is not parsed. That is, the RRU 101 transmits service data to the OTN device 102 by using a 10B code stream (CPRI.1-CPRI.7 services are corresponding to 8B/10B encoding) or a 66B code stream (CPRI.8-CPRI.n services (where n is greater than 8) are corresponding to 64B/66B encoding), and the OTN device 102 does not parse the CPRI service, but directly encapsulates the CPRI service by using 10B code or 66B code. Therefore, encapsulation efficiency is low, extra 2-bit bandwidth resources are consumed, and data transmission efficiency is relatively low.

In addition, an Optical Channel Payload Unit (OPU) in an Optical Channel Data Unit (ODU) frame is usually divided based on a 1.25 G timeslot to obtain several OPU timeslots, and the CPRI service is mapped into the several OPU timeslots. However, because 1.25 G is not a minimum granularity bandwidth of the CPRI service, a bandwidth of the OPU cannot be fully utilized, resulting in a bandwidth waste.

Figure 2:
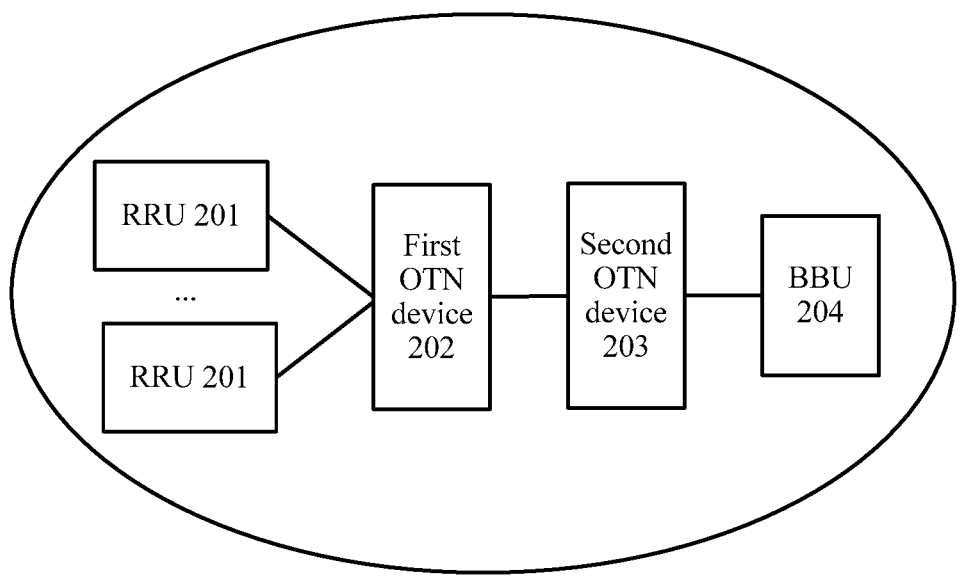
FIG. 2 is a schematic diagram of an applicable network architecture according to an embodiment of the present invention.

FIG. 2 is a schematic diagram of an applicable network architecture according to an embodiment of the present invention. As shown in FIG. 2, the network architecture includes at least one RRU 201, a first OTN device 202, a second OTN device 203, and a BBU 204.

A CPRI service is used as an example. In this embodiment of the present invention, the CPRI service is transmitted between the first OTN device 202 and the second OTN device 203 by using an 8B code stream/a 64B code stream, so that bandwidth resources can be saved, and data transmission efficiency can be improved.

Specifically, the RRU 201 transmits service data to the first OTN device 202 by using a 10B code stream (CPRI.1-CPRI.7 services are corresponding to 8B/10B encoding) or a 66B code stream (CPRI.8-CPRI.n services (where n is greater than 8) are corresponding to 64B/66B encoding). The first OTN device 202 decodes the 10B code/the 66B code to generate 8B code/64B code. Frame header indication information is inserted into the 8B code/the 64B code to generate a self-defined frame, and the self-defined frame is sent to the second OTN device 203. The second OTN device 203 demaps the self-defined frame and encodes the demapped self-defined frame to obtain the 10B code/the 66B code, and sends the 10B code/the 66B code to the BBU 204.

It should be understood that, in an embodiment, service data in this embodiment of the present invention may be a CPRI service, or may be a service of another type. A service type is not limited in this embodiment of the present invention, provided that a frame structure of the service is similar to a frame structure of the CPRI service. It should be further understood that, in this embodiment of the present invention, different CPRI services may be mapped into a same ODU frame, and services of different frame structure types may be encapsulated and mapped into a same ODU frame, and do not affect each other.

Figure 3:
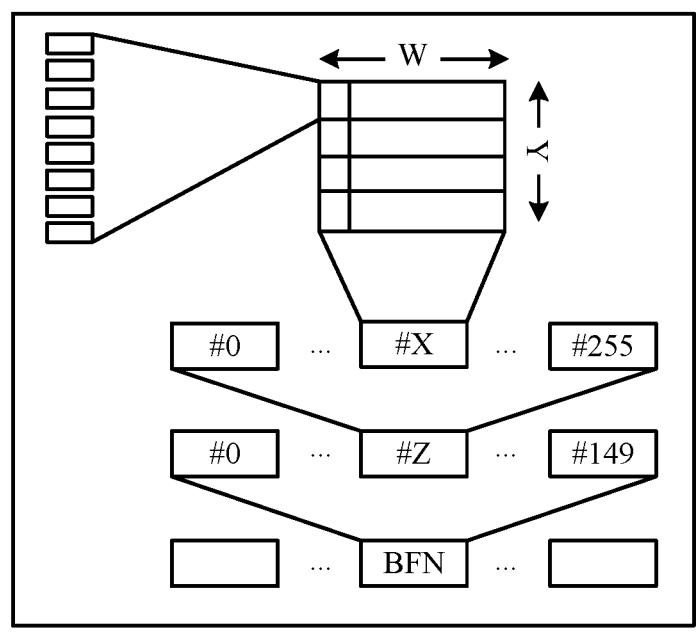
FIG. 3 is a schematic block diagram of a frame structure of a CPRI service.

The following describes a frame structure of a CPRI service in detail with reference to FIG. 3.

FIG. 3 is a schematic block diagram of a frame structure of a CPRI service. As shown in FIG. 3, the CPRI service includes multiple NodeB frame number (NodeB Frame Number, BFN) frames, and each BFN frame includes 150 superframes (which are respectively #0, #1 . . . #Z . . . , and #149). Each superframe includes 256 base frames (which are respectively #0, #1 . . . #X . . . , and #255). Each base frame has two parameters: W and Y, where W corresponds to a character quantity, and Y is used to indicate a byte rate of each character.

In an existing protocol, for CPRI.1-CPRI.7 services, an encoding manner is 8B/10B encoding; and for CPRI.8-CPRI.n services (where n is greater than 8), an encoding manner is 64B/66B encoding. Particularly, for the CPRI.1-CPRI.7 services, a character of Z.0.0 is K28.5; and for the CPRI.8-CPRI.n services (where n is greater than 8), the character of Z.0.0 is /S/. That is, a fixed character of a frame header location of each superframe in a CPRI service is K28.5 or /S/. Because 10B code is specified, frame header indication information may be defined in 8B code, and transmitted by using the 8B code, so as to reduce an extra bandwidth caused by 8B/10B encoding or 64B/66B encoding.

The following describes an embodiment of the present invention in detail.

Figure 4:
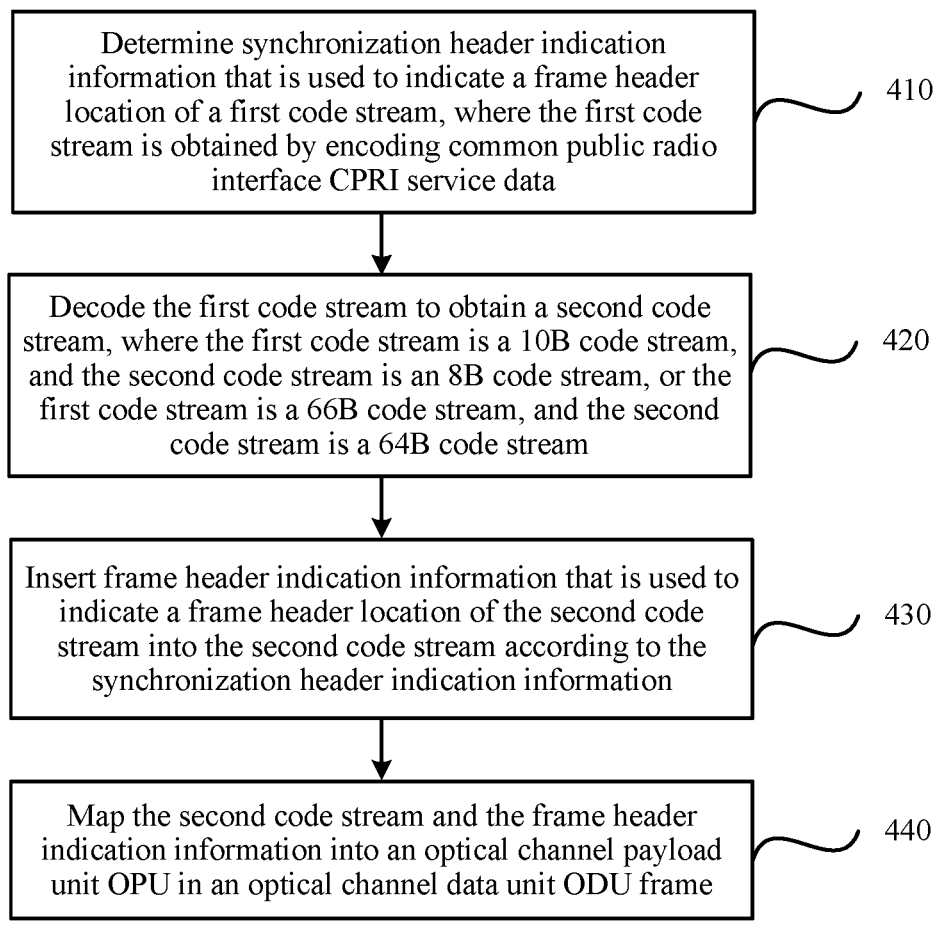
FIG. 4 is a schematic flowchart of a data transmission method according to an embodiment of the present invention.

FIG. 4 is a schematic flowchart of a data transmission method according to an embodiment of the present invention. The method shown in FIG. 4 may be performed by the first OTN device shown in FIG. 2. The method includes the following steps.

410. Determine synchronization header indication information indicating a frame header location of a first code stream, where the first code stream is obtained by encoding common public radio interface CPRI service data.

420. Decode the first code stream to obtain a second code stream, where the first code stream is a 10B code stream, and the second code stream is an 8B code stream, or the first code stream is a 66B code stream, and the second code stream is a 64B code stream.

430. Insert frame header indication information indicating a frame header location of the second code stream into the second code stream according to the synchronization header indication information.

440. Map the second code stream and the frame header indication information into an optical channel payload unit OPU in an optical channel data unit ODU frame.

In this embodiment of the present invention, a 10B code stream/a 66B code stream obtained by encoding service data is decoded to respectively obtain an 8B code stream/a 64B code stream, and frame header indication information that is used to indicate a frame header location is inserted, so as to generate a self-defined frame that is transmitted by using 8B/64B code. Overheads are peeled off, and the self-defined frame is directly mapped into a payload area for transmission, thereby avoiding a prior-art problem that efficiency is relatively low because redundant overheads are mapped. Therefore, a transmission bandwidth can be saved, and data transmission efficiency can be improved in this embodiment of the present invention.

In some embodiments, in another embodiment, if the first code stream may include at least one superframe, a frame header location of the at least one superframe may be a location of Z.0.0 according to description of a frame format shown in FIG. 3. Specifically, the synchronization header indication information may be used to indicate a frame header location corresponding to a superframe in the first code stream.

It should be understood that, only one piece of synchronization header indication information is described in this embodiment of the present invention, and a frame header location of each superframe in the first code stream is indicated by synchronization header indication information. It should be further understood that, only one piece of frame header indication information is described in this embodiment of the present invention, several pieces of frame header indication information may be inserted into the second code stream, and each piece of frame header indication information is used to indicate a frame header location of each frame in the second code stream.

The frame header location of each superframe may be identified in 10B code/66B code by using a code block with a character K28.5 or /S/, but the frame header location cannot be identified in 8B code/64B code. Therefore, according to the synchronization header indication information that is used to indicate the frame header location of the first code stream (10B code/66B code), the corresponding frame header indication information is inserted into the second code stream (8B code/64B code) that is obtained by means of decoding, to indicate the frame header location of the second code stream, so as to generate a self-defined frame. The self-defined frame is mapped into an ODU frame, and is sent to an OTN device, so that the OTN device encodes the self-defined frame and sends the encoded self-defined frame to a BBU. In this case, the OTN device may be the second OTN device 203 shown in FIG. 2. The OTN device (the second OTN device 203) encodes the self-defined frame to obtain 10B code/66B code and transmits the 10B code/the 66B code to the BBU.

It should be understood that, the self-defined frame may be generated by inserting the frame header indication information into the second code stream. The second code stream and the frame header indication information are mapped into the OPU, that is, the self-defined frame is mapped into the OPU.

Optionally, in another embodiment, in step 440, the OTN device may perform timeslot division on the OPU based on a minimum granularity bandwidth of the CPRI service data to obtain at least one OPU timeslot; and map the self-defined frame (including the second code stream and the frame header indication information) into the OPU in the ODU frame.

In this embodiment of the present invention, timeslot division is performed based on a minimum granularity bandwidth of service data (for example, CPRI service data), so that a bandwidth can be fully utilized, and bandwidth utilization can be improved. In addition, a CPRI rate can be well configured, and mapping efficiency can be improved.

It should be understood that, timeslot division of an OTN frame format may be the same as timeslot division of the ODU frame and timeslot division of the OPU.

If the service is a CPRI service, and a minimum granularity bandwidth of the CPRI service is 491.52 M, a minimum timeslot bandwidth that is of each divided OPU timeslot and that may be obtained by means of calculation may be 492.48 M. For example, the minimum timeslot bandwidth of the CPRI is 492.48 M, each N 10 G OTN services may be divided into 24×N OPU timeslots (if 10 G is used as an example for description, a 5 G OTN service corresponds to 12 timeslots, and another bandwidth is analogized according to this).

Optionally, in another embodiment, if a timeslot may be indicated by using a corresponding overhead area, CPRI service data is encapsulated into an OTN service, and an OTN service rate may exactly match a CPRI service rate.

Optionally, in another embodiment, the at least one OPU timeslot corresponds to at least one piece of identification information. In step 440, the OTN device may determine first data corresponding to first identification information in the at least one piece of identification information in the second code stream and the frame header indication information according to the at least one piece of identification information; and map the first data into an OPU timeslot corresponding to the first identification information.

Optionally, in another embodiment, the at least one piece of identification information may be indicated based on an overhead byte in the ODU frame.

It should be understood that, the identification information in this embodiment of the present invention may be indicated based on an original overhead byte in the ODU frame, or may be indicated based on an inserted overhead byte.

Optionally, in another embodiment, a bandwidth of each OPU timeslot in the at least one OPU timeslot is greater than or equal to 492.48 M.

It should be understood that, if timeslot division is performed based on the minimum granularity bandwidth of the CPRI service data, a minimum timeslot bandwidth of a bandwidth of each OPU timeslot is a minimum granularity bandwidth of service data. If the minimum granularity bandwidth of the CPRI service is 492.48 M, the bandwidth of the OPU timeslot only needs to be greater than or equal to 492.48 M. A smaller bandwidth of the OPU timeslot indicates higher bandwidth utilization.

Specifically, a 10 G bandwidth is used as an example for description. An ODU bandwidth, a frame header, and an OPU Multi-Frame Identifier (OMFI) are generated according to a local clock, where the OMFI ranges from 0 to 239. In this embodiment of the present invention, the OMFI may be used to indicate an allocated timeslot number (that is, identification information corresponding to an OPU timeslot).

The OTN device may count a quantity of columns according to the frame header indication information in the self-defined frame, where a column range is from 1 to 3824, and a payload area ranges from 17 to 3824. A column quantity of the payload area is 3808, but 3808 cannot be divisible by 12. Therefore, in this embodiment of the present invention, 3804 columns may be selected for loading services, and four other columns are used for filling.

OPU timeslots may be arranged and circulated according to serial numbers 0-23. Therefore, each OPU timeslot may be evenly distributed in a payload area of the ODU frame.

Optionally, in another embodiment, each timeslot number may be corresponding to a client service, and multiple timeslot numbers may be corresponding to a same client service. That is, when there is a large client service, multiple timeslot numbers may be allocated to the client service. Further, when multiple OPU timeslots are corresponding to a same client service, the multiple OPU timeslots may be arranged in ascending order of timeslot numbers, and reading and writing are simultaneously performed.

Data of a client service corresponding to each timeslot number may be read according to at least one piece of identification information (at least one timeslot number). That is, each piece of identification information in the at least one piece of identification information corresponds to a client service, and the corresponding client service has transmission data. There is a correspondence between each piece of identification information in the at least one piece of identification information and data.

It should be understood that, the first identification information may be any one piece of identification information in the at least one piece of identification information. Only one piece of identification information is described in this embodiment of the present invention, and actually, each piece of identification information corresponds to different data. In a mapping process, the data corresponding to each piece of identification information in the at least one piece of identification information may be mapped into an OPU timeslot corresponding to each piece of identification information. For example, if timeslot numbers (identification information) corresponding to data of a client service are 1, 2, and 3, the data of the client service is mapped into three OPU timeslots corresponding to the timeslot numbers (identification information) that are 1, 2, and 3.

It should be understood that, a configuration relationship between each OPU timeslot and a client service may be transmitted by means of channel association by using a corresponding overhead location. For example, transmission is performed by using a Payload Structure Identifier (PSI).

The following describes in detail a process in which the first code stream is encoded to obtain the second code stream, and the self-defined frame is generated.

Figure 5:
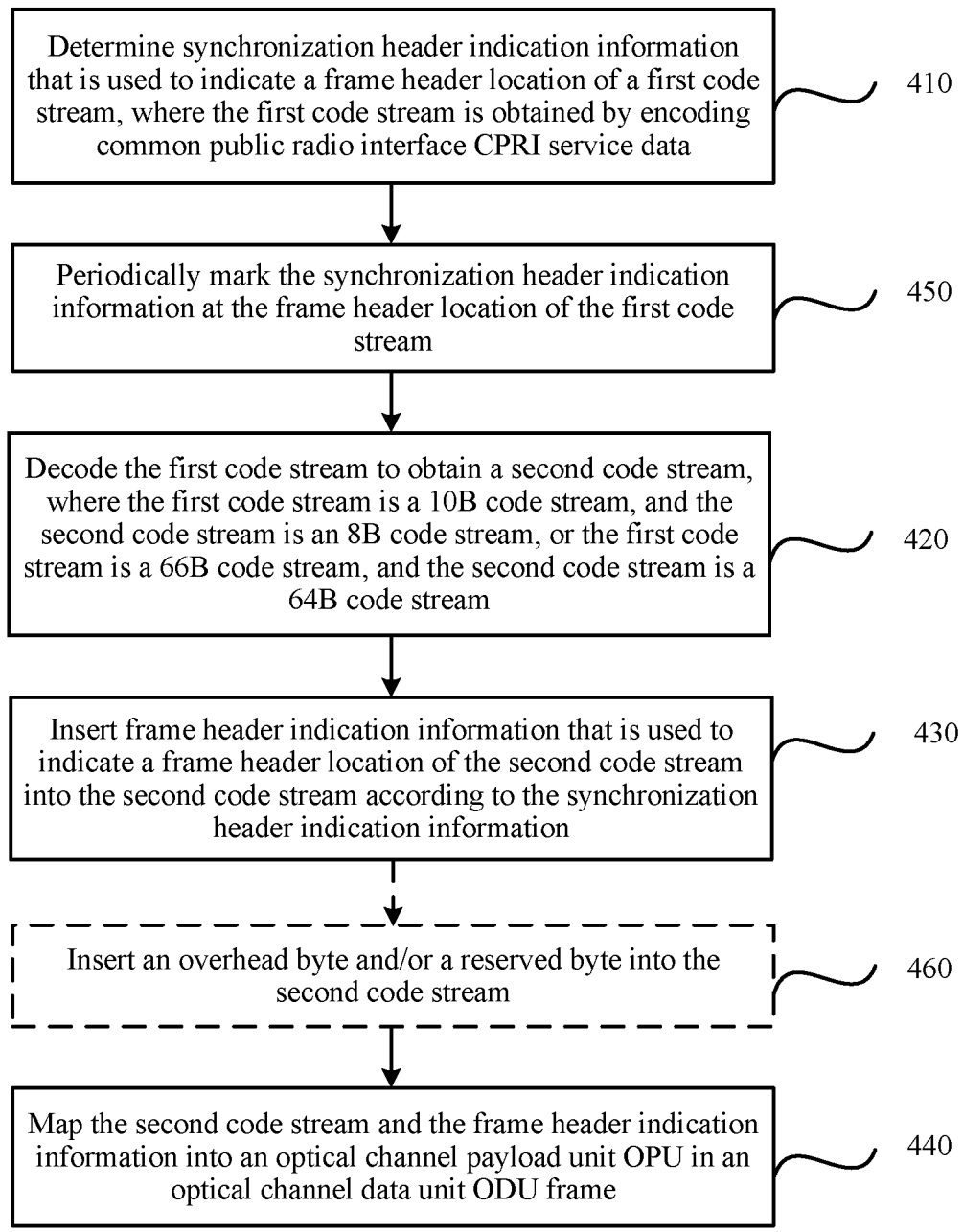
FIG. 5 is a schematic flowchart of a data transmission method according to another embodiment of the present invention.

FIG. 5 is a schematic flowchart of a data transmission method according to another embodiment of the present invention. The method shown in FIG. 5 may be performed by the first OTN device shown in FIG. 2. For same steps in FIG. 5 and FIG. 4, a same encoding manner may be used. Before step 420, the method shown in FIG. 4 may further include the following step:

450. Periodically mark the synchronization header indication information at the frame header location of the first code stream.

Optionally, in another embodiment, when the first code stream is a 10B code stream, and the second code stream is an 8B code stream, in step 450, the OTN device may identify a first code block with a character K28.5 in the first code stream; and mark a location of the first code block as first synchronization header indication information. In step 430, the OTN device may insert the frame header indication information into the second code stream before the first synchronization header indication information according to the first synchronization header indication information in the first code stream.

It should be understood that, the self-defined frame may be generated by inserting the frame header indication information into the second code stream.

Optionally, in another embodiment, when the first code stream is a 66B code stream, and the second code stream is a 64B code stream, in step 450, the OTN device may identify a second code block with a character /S/ in the first code stream; and mark a location of the second code block as second synchronization header indication information. In step 430, the OTN device may insert the frame header indication information into the second code stream before the second synchronization header indication information according to the second synchronization header indication information in the first code stream.

It should be understood that, only one piece of frame header indication information is described in this embodiment of the present invention. For the second code stream, one piece of frame header indication information may be inserted before each piece of synchronization header indication information to generate a self-defined frame.

Optionally, in another embodiment, before step 440, the method may further include the following step:

460. Insert an overhead byte and/or a reserved byte into the second code stream.

In step 440, specifically, the OTN device may map the second code stream, the frame header indication information, and the overhead byte and/or the reserved byte into the OPU in the ODU frame.

It should be understood that, if the overhead byte and/or the reserved byte are/is inserted into the second code stream, the self-defined frame includes the inserted overhead byte and/or the inserted reserved byte.

Specifically, CPRI.1-CPRI.7 services are used as an example to specifically describe a process in which the first code stream is encoded to obtain the second code stream, and the self-defined frame is generated.

In this embodiment of the present invention, 8B code is obtained by means of decoding by using particularity of a frame structure of a CPRI service. The frame header indication information is added to a frame header of each superframe, the self-defined frame is generated, and the overhead byte and/or the reserved byte are/is inserted.

1. Identify a first code block with a character K28.5 in a first code stream, and mark the first code block as first synchronization header indication information.

Whether K28.5 is leftmost in a same clock cycle is checked. If K28.5 is not leftmost in the same clock cycle, data is shifted, and the code block with K28.5 is shifted to the leftmost location of the same clock cycle. At least one piece of first synchronization header indication information is transmitted with the first code stream.

It should be understood that, the first code block is any one of code blocks with a character K28.5, only one code block is described in this embodiment of the present invention, and another code block is similar.

2. Decode the first code stream to obtain a second code stream.

Specifically, a table may be searched in a unit of 10 bits, and 10B code is translated into 8B code. A specific 8B/10B table entry may be based on an 802.3 protocol.

3. Perform a search according to all first synchronization header indication information corresponding to all first code blocks, and determine a frame header location of each superframe in the first code stream.

4. Insert one piece of frame header indication information into the second code stream before each piece of first synchronization header indication information.

Specifically, in this embodiment of the present invention, if a byte quantity of a superframe is 4096, the first synchronization header indication information may be used as a start location to perform slicing in a unit of 4096 bytes, and a slicing header mark is added. Frame header indication information is inserted before the first synchronization header indication information to indicate a frame header location of the second code stream. In this way, the frame header indication information is inserted into the second code stream, so as to generate the self-defined frame.

Optionally, in another embodiment, a special byte may be used to indicate frame header indication information, and the frame header indication information may be two bytes, or may be four bytes. A specific form of the frame header indication information is not limited in this embodiment of the present invention.

5. Insert an overhead byte and/or a reserved byte into the second code stream.

Specifically, in this embodiment of the present invention, the overhead byte may be inserted after the frame header indication information and before the first synchronization header indication information, and a byte quantity of the overhead byte may be six bytes. A reserved byte of eight bytes may be inserted at a location of the slicing header mark in this embodiment of the present invention. It should be understood that, the byte quantity of the overhead byte and a byte quantity of the reserved byte are not limited in this embodiment of the present invention.

Figure 6:
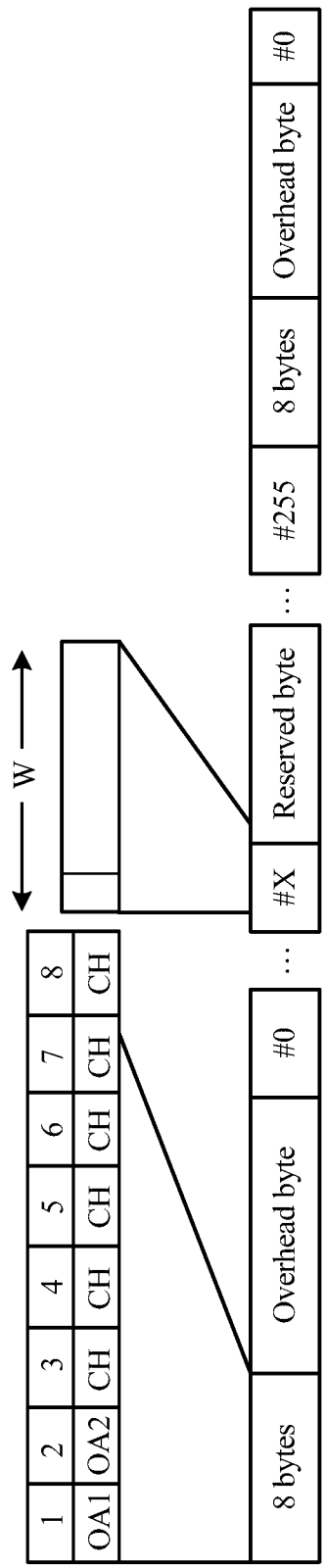
FIG. 6 is a schematic diagram of a self-defined frame format according to an embodiment of the present invention.

FIG. 6 is a schematic diagram of a self-defined frame format according to an embodiment of the present invention. As shown in FIG. 6, frame header indication information in the self-defined frame format may be two bytes, and the frame header indication information may be indicated by two special byte characters: OA1 and OA2. In addition, an overhead byte of six bytes may be inserted after the frame header indication information, and the overhead byte may be indicated by OH. In the self-defined frame, a reserved byte of several bytes may further be inserted. A byte quantity of the reserved byte is not limited in this embodiment of the present invention.

Figure 7:
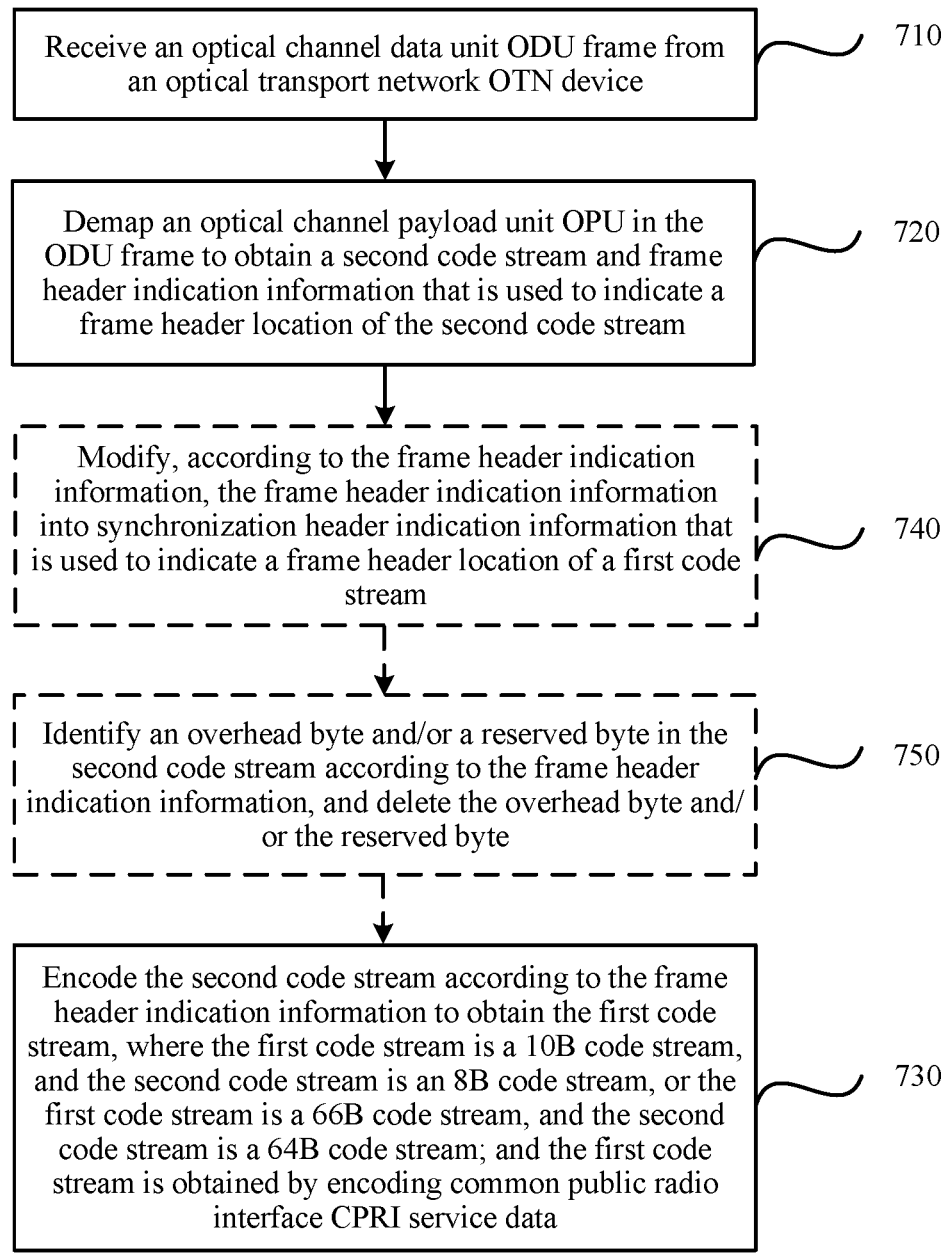
FIG. 7 is a schematic flowchart of a data transmission method according to another embodiment of the present invention.

FIG. 7 is a schematic flowchart of a data transmission method according to another embodiment of the present invention. The method shown in FIG. 7 may be performed by the second OTN device shown in FIG. 2. The method includes the following steps.

710. Receive an optical channel data unit ODU frame from an optical transport network OTN device.

720. Demap an optical channel payload unit OPU in the ODU frame to obtain a second code stream and frame header indication information indicating a frame header location of the second code stream.

730. Encode the second code stream according to the frame header indication information to obtain a first code stream, where the first code stream is a 10B code stream, and the second code stream is an 8B code stream, or the first code stream is a 66B code stream, and the second code stream is a 64B code stream; and the first code stream is obtained by encoding common public radio interface CPRI service data.

In this embodiment of the present invention, a first OTN device decodes a 10B code stream/a 66B code stream that is obtained by encoding service data to respectively obtain an 8B code stream/a 64B code stream, and inserts frame header indication information that is used to indicate a frame header location of the 8B code stream/the 64B code stream, so as to generate a self-defined frame that is transmitted by using 8B/64B code. A second OTN device demaps an ODU frame received from the first OTN device to obtain the self-defined frame, and encodes the self-defined frame to obtain 10B code/66 code again. In this way, between the two OTN devices, Overheads are peeled off, and the self-defined frame is directly mapped into a payload area for transmission, thereby avoiding a prior-art problem that efficiency is relatively low because redundant overheads are mapped. Therefore, a transmission bandwidth between the two OTN devices can be saved, and data transmission efficiency can be improved in this embodiment of the present invention.

The second OTN device in FIG. 7 may receive an ODU frame from the first OTN device shown in FIG. 2, and the ODU frame may be obtained by using the method shown in FIG. 4 or FIG. 5. As shown in FIG. 4 or FIG. 5, a self-defined frame may be generated by using the second code stream and the frame header indication information that is used to indicate the frame header location of the second code stream.

It should be understood that, the first code stream is a 10B code stream, and the second code stream is an 8B code stream, or the first code stream is a 66B code stream, and the second code stream is a 64B code stream.

In an existing protocol, for CPRI.1-CPRI.7 services, an encoding manner is 8B/10B encoding; and for CPRI.8-CPRI.n services (where n is greater than 8), an encoding manner is 64B/66B encoding. Particularly, for the CPRI.1-CPRI.7 services, a character of Z.0.0 is K28.5; and for the CPRI.8-CPRI.n services (where n is greater than 8), the character of Z.0.0 is /S/. That is, a fixed character of a frame header location of each superframe in a CPRI service is K28.5 or /S/.

The frame header location of each superframe may be identified in 10B code/66B code by using a code block with a character K28.5 or /S/, but the frame header location cannot be identified in 8B code/64B code. Therefore, the corresponding frame header indication information is inserted into the second code stream (8B code/64B code) that is obtained after the first OTN device decodes the first code stream, to indicate the frame header location of the second code stream, so as to generate the self-defined frame. The self-defined frame is mapped into the ODU frame, and is sent to the second OTN device shown in FIG. 6, so that the second OTN device encodes the self-defined frame and sends the encoded self-defined frame to a BBU. The second OTN device 203 encodes the self-defined frame to obtain 10B code/66B code and transmits the 10B code/the 66B code to the BBU.

The first code stream may include at least one superframe, and a frame header location of the at least one superframe may be a location of Z.0.0 according to description of a frame format shown in FIG. 3. Specifically, the synchronization header indication information may be used to indicate a frame header location corresponding to a superframe in the first code stream.

Optionally, in another embodiment, the OPU includes at least one OPU timeslot obtained by performing timeslot division based on a minimum granularity bandwidth of the CPRI service data.

In this embodiment of the present invention, timeslot division is performed based on a minimum granularity bandwidth of service data, so that a bandwidth can be fully utilized, and bandwidth utilization can be improved. In addition, a CPRI rate can be well configured, and mapping efficiency can be improved.

It should be understood that, timeslot division of an OTN frame format may be the same as timeslot division of the ODU frame and timeslot division of the OPU.

If the service is a CPRI service, and a minimum granularity bandwidth of the CPRI service is 491.52 M, a minimum timeslot bandwidth that is of each divided OPU timeslot and that may be obtained by means of calculation may be 492.48 M. For example, the minimum timeslot bandwidth of the CPRI is 492.48 M, each N 10 G OTN services may be divided into 24×N OPU timeslots (if 10 G is used as an example for description, a 5 G OTN service corresponds to 12 timeslots, and another bandwidth is analogized according to this).

Optionally, in another embodiment, if a timeslot may be indicated by using a corresponding overhead area, CPRI service data is encapsulated into an OTN service, and an OTN service rate may exactly match a CPRI service rate.

Optionally, in another embodiment, a bandwidth of the OPU timeslot is greater than or equal to 492.48 M.

Optionally, in another embodiment, at least one piece of identification information is indicated based on an overhead byte in the ODU frame. It should be understood that, the identification information in this embodiment of the present invention may be indicated based on an original overhead byte in the ODU frame, or may be indicated based on an inserted overhead byte.

It should be understood that, if timeslot division is performed based on the minimum granularity bandwidth of the CPRI service data, a minimum timeslot bandwidth of a bandwidth of each OPU timeslot is a minimum granularity bandwidth of service data. If the minimum granularity bandwidth of the CPRI service is 492.48 M, the bandwidth of the OPU timeslot only needs to be greater than or equal to 492.48 M. A smaller bandwidth of the OPU timeslot indicates higher bandwidth utilization.

Specifically, a 10 G bandwidth is used as an example for description. An ODU bandwidth, a frame header, and an OMFI are generated according to a local clock, where the OMFI ranges from 0 to 239. In this embodiment of the present invention, the OMFI may be used to indicate an allocated timeslot number (that is, identification information corresponding to an OPU timeslot).

When the self-defined frame is being generated, the OTN device may count a quantity of rows and a quantity of columns according to the frame header indication information in the self-defined frame, where a column range is from 1 to 3824, and a payload area ranges from 17 to 3824. A column quantity of the payload area is 3808, but 3808 cannot be divisible by 12. Therefore, in this embodiment of the present invention, 3804 columns may be selected for loading services, and four other columns are used for filling.

OPU timeslots may be arranged and circulated according to serial numbers 0-23. Therefore, each OPU timeslot may be evenly distributed in a payload area of the ODU frame.

Optionally, in another embodiment, each OPU timeslot may be corresponding to one timeslot number. Each timeslot number may be corresponding to a client service, and multiple timeslot numbers may be corresponding to a same client service. That is, when there is a large client service, multiple timeslot numbers may be allocated to the client service. Further, when multiple OPU timeslots are corresponding to a same client service, the multiple OPU timeslots may be arranged in ascending order of timeslot numbers, and reading and writing are simultaneously performed.

Optionally, in another embodiment, at least one OPU timeslot corresponds to at least one piece of identification information. In step 720, the second OTN device may parse the overhead byte in the ODU frame to obtain a correspondence between the at least one piece of identification information and corresponding data; and parse an overhead byte of the OPU in the ODU frame, and obtain the second code stream and the frame header indication information according to the correspondence.

It should be understood that, the second code stream and the frame header indication information may be the self-defined frame described above.

Specifically, the second OTN device may perform PSI overhead parsing on the ODU frame, to obtain the correspondence between the at least one piece of identification information and the corresponding data; obtain a corresponding Connection Monitoring (CM) value by means of parsing according to a Justification Control (JC) overhead area; and obtain the self-defined frame (the second code stream and the frame header indication information) according to the CM value and the correspondence.

Data of a client service corresponding to each timeslot number may be read according to the at least one piece of identification information (at least one timeslot number). That is, each piece of identification information in the at least one piece of identification information corresponds to a client service, and the corresponding client service has transmission data. There is a correspondence between each piece of identification information in the at least one piece of identification information and data.

It should be understood that, in a mapping process, the data corresponding to each piece of identification information in the at least one piece of identification information may be mapped into an OPU timeslot corresponding to each piece of identification information. For example, if timeslot numbers (identification information) corresponding to data of a client service are 1, 2, and 3, the data of the client service is mapped into three OPU timeslots corresponding to the timeslot numbers (identification information) that are 1, 2, and 3.

It should be understood that, a configuration relationship between each OPU timeslot and a client service may be transmitted by means of channel association by using a corresponding overhead location. For example, transmission is performed by using a PSI.

Optionally, in another embodiment, before step 730, the method shown in FIG. 7 may further include the following step:

740. Modify, according to the frame header indication information, the frame header indication information into synchronization header indication information that is used to indicate a frame header location of the first code stream.

It should be understood that, because a frame structure of a CPRI service is special, a special code block may be used to indicate a frame header location of a superframe in the first code stream. In an existing protocol, for CPRI.1-CPRI.7 services, an encoding manner is 8B/10B encoding; and for CPRI.8-CPRI.n services (where n is greater than 8), an encoding manner is 64B/66B encoding. Particularly, for the CPRI.1-CPRI.7 services, a character of Z.0.0 is K28.5; and for the CPRI.8-CPRI.n services (where n is greater than 8), the character of Z.0.0 is /S/. That is, a fixed character of a frame header location of each superframe in a CPRI service is K28.5 or /S/. Therefore, the special code block may be a code block with a byte K28.5 or /S/.

Optionally, in another embodiment, if the first code stream may include at least one superframe, a frame header location of the at least one superframe may be a location of Z.0.0 according to description of a frame format shown in FIG. 3. Specifically, at least one piece of synchronization header indication information may be used to indicate at least one frame header location corresponding to the at least one superframe in the first code stream.

Optionally, in another embodiment, when the first code stream is a 10B code stream, and the second code stream is an 8B code stream, the second OTN device may modify, according to the synchronization header indication information, a character of the location indicated by the synchronization header indication information into K28.5.

Optionally, in another embodiment, when the first code stream is a 66B code stream, and the second code stream is a 64B code stream, the second OTN device may modify a character of the location indicated by the synchronization header indication information into /S/ according to the synchronization header indication information.

Optionally, in another embodiment, before step 730, the method shown in FIG. 7 may further include the following step:

750. Identify an overhead byte and/or a reserved byte in the second code stream according to the frame header indication information, and delete the overhead byte and/or the reserved byte.

It should be understood that, there is no sequence between step 740 and step 750.

Specifically, the following describes a demapping process of the second OTN device by using 8B/10B encoding as an example.

1. The second OTN device receives an ODU frame into which a self-defined frame is mapped from the first OTN device.

2. Perform PSI overhead parsing on an OPU in the ODU frame to obtain a correspondence between at least one piece of identification information and corresponding data.

3. Obtain a corresponding CM value by means of parsing according to a JC overhead area, and obtain a self-defined frame (including a second code stream and frame header indication information) according to the correspondence.

It should be understood that, the self-defined frame may be obtained by using the method shown in FIG. 4 or FIG. 5.

4. Perform frame searching processing on the self-defined frame to obtain the frame header indication information.

If no frame header indication information is found, an LOF alarm and an OOF alarm are reported.

Figure 8:
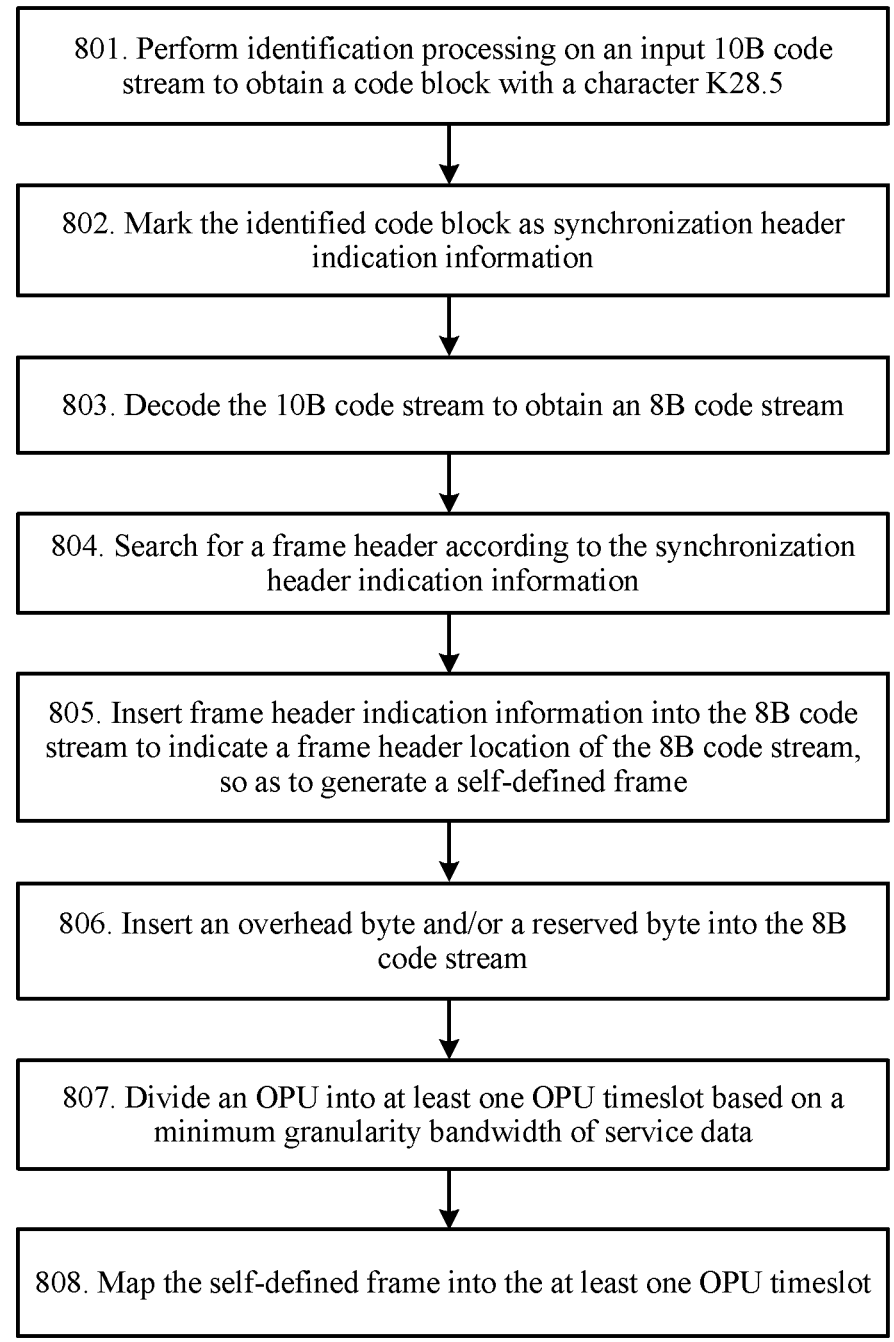
FIG. 8 is a schematic diagram of a searching frame state machine for reporting an LOF alarm and an OOF alarm.

Specifically, FIG. 8 is a schematic diagram of a searching frame state machine for reporting a loss of frame (Loss Of Frame, LOF) alarm and an out of frame (Out Of Frame, OOF) alarm. In FIG. 8, OOF is out of frame, and Identification Frame (IF) is an identification frame.

When an OOF state lasts 3 ms, the LOF alarm is reported; and when an IF state lasts 3 ms, the LOF alarm is lifted.

Switch conditions for the state machine are as follows:

Condition 1: If frame header indication information of X consecutive frames is not correct, the state machine switches from an IF state to an OOF state, where a value of X is from 1 to 64, and a default value may be "5".

Condition 2: If frame header indication information of two consecutive frames is correct, the state machine switches from an OOF state to an IF state.

Condition 3: If all conditions except the condition 2 are met, the state machine stays in an OOF state.

Condition 4: If all conditions except the condition 1 are met, the state machine stays in an IF state.

5. According to the found frame header indication information, determine an overhead byte and a reserved byte, perform corresponding overhead processing, and delete the overhead byte and the reserved byte.

6. Modify the frame header indication information into synchronization header indication information.

7. Modify a character of a location indicated by the synchronization header indication information into K28.5.

It should be understood that, if a 64B/66B encoding manner is used as an example, a character of the frame header indication information is modified into /S/.

8. Find a corresponding control character location and a data payload location according to the synchronization header indication information, then search an 8B/10B code table, encode an 8B code stream, and convert the 8B code stream into a 10B code stream for transmission.

In this embodiment of the present invention, a first OTN device decodes a 10B code stream/a 66B code stream that is obtained by encoding service data to respectively obtain an 8B code stream/a 64B code stream, and inserts frame header indication information that is used to indicate a frame header location of the 8B code stream/the 64B code stream, so as to generate a self-defined frame that is transmitted by using 8B/64B code. A second OTN device demaps an ODU frame received from the first OTN device to obtain the self-defined frame, and encodes the self-defined frame to obtain 10B code/66 code again. In this way, between the two OTN devices, Overheads are peeled off, and the self-defined frame is directly mapped into a payload area for transmission, thereby avoiding a prior-art problem that efficiency is relatively low because redundant overheads are mapped. Therefore, a transmission bandwidth between the two OTN devices can be saved, and data transmission efficiency can be improved in this embodiment of the present invention.

In this embodiment of the present invention, timeslot division is performed based on a minimum granularity bandwidth of service data (for example, CPRI service data), so that a bandwidth can be fully utilized, and bandwidth utilization can be improved. In addition, a CPRI rate can be well configured, and mapping efficiency can be improved.

FIG. 8 is a schematic flowchart of an information transmission process according to an embodiment of the present invention. The process shown in FIG. 8 may be performed by the first OTN device shown in FIG. 2. The process may include the following steps.

801. Perform identification processing on an input 10B code stream to obtain a code block with a character K28.5.

Optionally, whether K28.5 is leftmost in a same clock cycle is checked. If K28.5 is not leftmost in the same clock cycle, data is shifted, and the code block with K28.5 is shifted to the leftmost location of the same clock cycle.

Optionally, in another embodiment, identification processing may be performed on an input 66B code stream to obtain a code block with a character /S/ in this embodiment of the present invention.

Optionally, whether /S/ is leftmost in a same clock cycle is checked. If /S/ is not leftmost in the same clock cycle, data is shifted, and the code block with /S/ is shifted to the leftmost location of the same clock cycle.

In an existing protocol, for CPRI.1-CPRI.7 services, an encoding manner is 8B/10B encoding; and for CPRI.8-CPRI.n services (where n is greater than 8), an encoding manner is 64B/66B encoding. If 10B code is inputted, the code block with a character K28.5 is identified; or if 66B code is inputted, the code block with a character /S/ is identified. Particularly, for the CPRI.1-CPRI.7 services, a character of Z.0.0 is K28.5; and for the CPRI.8-CPRI.n services (where n is greater than 8), the character of Z.0.0 is /S/. That is, a fixed byte of a frame header location of each superframe in a CPRI service is K28.5 or /S/.

It should be understood that, the 10B code stream in this embodiment of the present invention may include multiple code blocks with a character K28.5, and the 66B code stream may include multiple code blocks with a character /S/.

802. Mark the identified code block as synchronization header indication information.

The synchronization header indication information is transmitted with the 10B/66B code stream.

The frame header location of each superframe may be identified in 10B code/66B code by using a code block with a character K28.5 or /S/, but the frame header location cannot be identified in 8B code/64B code. If the input 10B/66B code stream may include at least one superframe, a frame header location of the at least one superframe may be a location of Z.0.0 according to description of a frame format shown in FIG. 3. Specifically, the synchronization header indication information may be used to indicate a frame header location corresponding to a superframe in a first code stream.

A location of the identified code block is a frame header location of a superframe in the input 10B/66B code stream, that is, the location of Z.0.0.

It should be understood that, only one piece of synchronization header indication information is described in this embodiment of the present invention, and a frame header location of each superframe in the 10B code stream or the 66B code stream is indicated by synchronization header indication information.

803. Decode the 10B code stream to obtain an 8B code stream.

Optionally, in another embodiment, the 66B code stream may be decoded to obtain a 64B code stream in this embodiment of the present invention.

It should be understood that, a decoding method is not limited in this embodiment of the present invention.

Specifically, a table may be searched in a unit of 10 bits, and 10B code is translated into 8B code. A specific 8B/10B table entry may be based on an 802.3 protocol.

Alternatively, when the 66B code stream is decoded to obtain the 64B code stream, a table is searched in a unit of 66 bits, and 66B code is translated into 64B code. A specific 64B/66B table entry may be based on an 802.3 protocol.

804. Search for a frame header according to the synchronization header indication information.

The synchronization header indication information is the frame header location of the superframe in the 10B code stream.

Alternatively, the synchronization header indication information is the frame header location of the superframe in the 66B code stream.

It should be understood that, a method for searching for a frame header is not limited in this embodiment of the present invention.

805. Insert frame header indication information into the 8B code stream to indicate a frame header location of the 8B code stream, so as to generate a self-defined frame.

Optionally, in another embodiment, frame header indication information may be inserted into the 64B code stream to indicate a frame header location of the 64B code stream, so as to generate a self-defined frame in this embodiment of the present invention.

Specifically, in an example of the 8B code stream, if a byte quantity of a superframe in the 10B code stream is 4096, the synchronization header indication information may be used as a start location in this embodiment of the present invention to perform slicing in a unit of 4096 bytes, and a slicing header mark is added. Frame header indication information is inserted before the synchronization header indication information to indicate a frame header location of a second code stream. In this way, frame header indication information is inserted at each frame header location in the 8B code stream, so as to generate a self-defined frame.

Optionally, in another embodiment, a special byte may be used to indicate frame header indication information, and the frame header indication information may be two bytes, or may be four bytes. A specific form of the frame header indication information is not limited in this embodiment of the present invention.

806. Insert an overhead byte and/or a reserved byte into the 8B code stream.

Specifically, in this embodiment of the present invention, the overhead byte may be inserted after the frame header indication information and before the synchronization header indication information, and a byte quantity of the overhead byte may be six bytes. A reserved byte of eight bytes may be inserted at a location of the slicing header mark in this embodiment of the present invention. It should be understood that, the byte quantity of the overhead byte and a byte quantity of the reserved byte are not limited in this embodiment of the present invention, and an insertion location of the overhead byte and an insertion location of the reserved byte are not limited either in this embodiment of the present invention.

807. Divide an OPU into at least one OPU timeslot based on a minimum granularity bandwidth of service data.

It should be understood that, if timeslot division is performed based on the minimum granularity bandwidth of the service data (for example, CPRI service data), a minimum timeslot bandwidth of a bandwidth of each OPU timeslot is the minimum granularity bandwidth of the service data. If the minimum granularity bandwidth of the CPRI service data is 492.48 M, the bandwidth of the OPU timeslot only needs to be greater than or equal to 492.48 M. A smaller bandwidth of the OPU timeslot indicates higher bandwidth utilization.

Specifically, a 10 G bandwidth is used as an example for description. An ODU bandwidth, a frame header, and an OMFI are generated according to a local clock, where the OMFI ranges from 0 to 239. In this embodiment of the present invention, the OMFI may be used to indicate an allocated timeslot number (that is, identification information corresponding to an OPU timeslot).

The OTN device may count a quantity of rows and a quantity of columns according to at least one piece of frame header indication information in the self-defined frame, where a column range is from 1 to 3824, and a payload area ranges from 17 to 3824. A column quantity of the payload area is 3808, but 3808 cannot be divisible by 12. Therefore, in this embodiment of the present invention, 3804 columns may be selected for loading services, and four other columns are used for filling.

OPU timeslots may be arranged and circulated according to serial numbers 0-23. Therefore, each OPU timeslot may be evenly distributed in a payload area of an ODU frame.

Optionally, in another embodiment, each OPU timeslot may be corresponding to one timeslot number. Each timeslot number may be corresponding to a client service, and multiple timeslot numbers may be corresponding to a same client service. That is, when there is a large client service, multiple timeslot numbers may be allocated to the client service. Further, when multiple OPU timeslots are corresponding to a same client service, the multiple OPU timeslots may be arranged in ascending order of timeslot numbers, and reading and writing are simultaneously performed.

Data of a client service corresponding to each timeslot number may be read according to at least one piece of identification information (at least one timeslot number). That is, each piece of identification information in the at least one piece of identification information corresponds to a client service, and the corresponding client service has transmission data. There is a correspondence between each piece of identification information in the at least one piece of identification information and data.

It should be understood that, first identification information may be any one piece of identification information in the at least one piece of identification information. Only one piece of identification information is described in this embodiment of the present invention, and actually, each piece of identification information corresponds to different data. In a mapping process, the data corresponding to each piece of identification information in the at least one piece of identification information may be mapped into an OPU timeslot corresponding to each piece of identification information. For example, if timeslot numbers (identification information) corresponding to data of a client service are 1, 2, and 3, the data of the client service is mapped into three OPU timeslots corresponding to the timeslot numbers (identification information) that are 1, 2, and 3.

It should be understood that, a configuration relationship between each OPU timeslot and a client service may be transmitted by means of channel association by using a corresponding overhead location. For example, transmission is performed by using a PSI.

808. Map the self-defined frame into the at least one OPU timeslot.

In this embodiment of the present invention, a 10B code stream/a 66B code stream obtained by encoding service data is decoded to respectively obtain an 8B code stream/a 64B code stream, so as to generate a self-defined frame that is transmitted by using 8B/64B code. Overheads are peeled off, and the self-defined frame is directly mapped into a payload area for transmission, thereby avoiding a prior-art problem that efficiency is relatively low because redundant overheads are mapped. Therefore, a transmission bandwidth can be saved, and data transmission efficiency can be improved in this embodiment of the present invention.

In addition, in this embodiment of the present invention, timeslot division is performed based on a minimum granularity bandwidth of service data, so that a bandwidth can be fully utilized, and bandwidth utilization can be improved. In addition, a CPRI rate can be well configured, and mapping efficiency can be improved.

Figure 9:
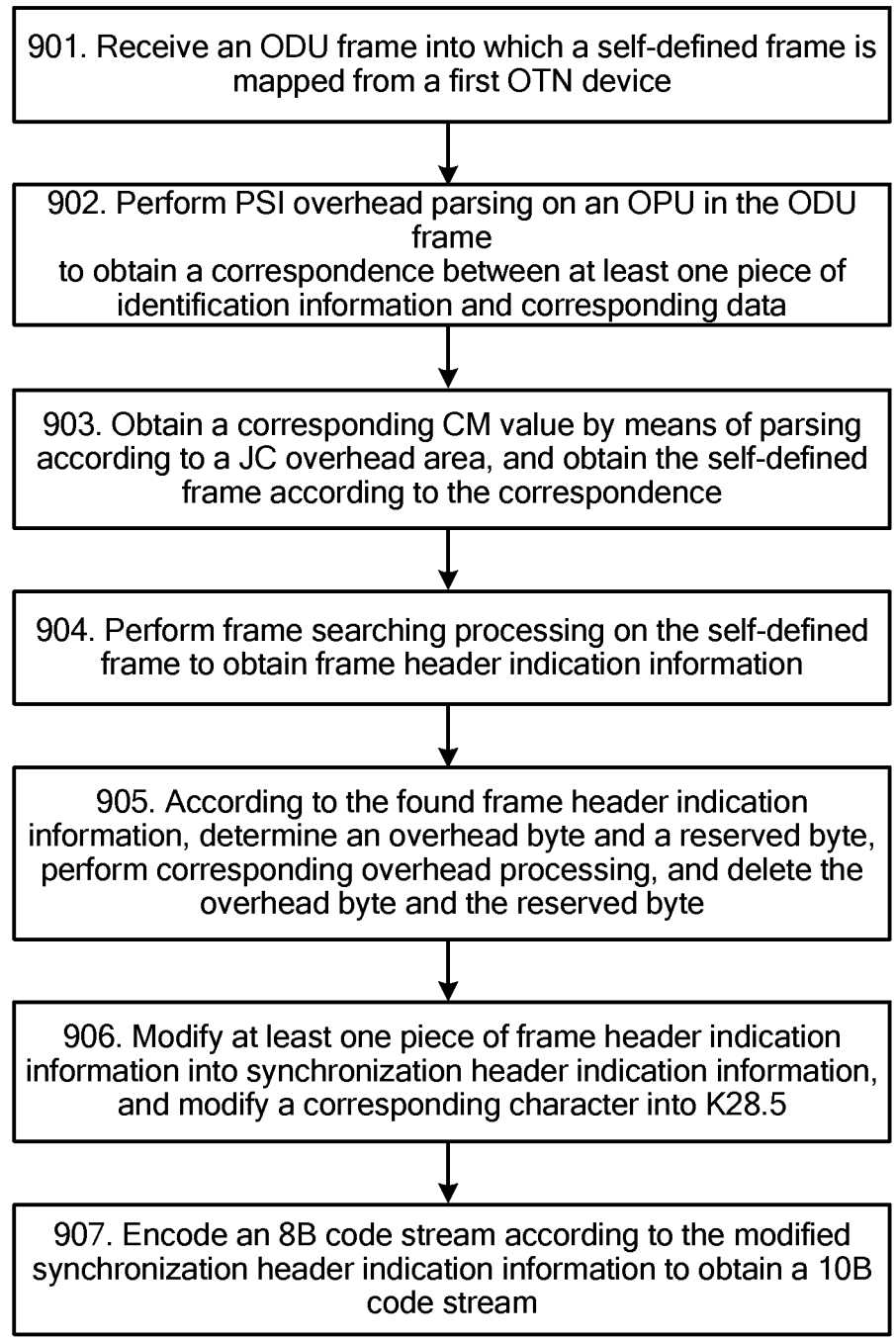
FIG. 9 is a schematic flowchart of an information transmission process according to another embodiment of the present invention.

FIG. 9 is a schematic flowchart of an information transmission process according to another embodiment of the present invention. The process shown in FIG. 9 may be performed by the second OTN device shown in FIG. 2. The process includes the following steps.

901. Receive an ODU frame into which a self-defined frame is mapped from a first OTN device.

902. Perform PSI overhead parsing on an OPU in the ODU frame to obtain a correspondence between at least one piece of identification information and corresponding data.

903. Obtain a corresponding CM value by means of parsing according to a JC overhead area, and obtain the self-defined frame according to the correspondence.

It should be understood that, the self-defined frame may be obtained by using the method shown in FIG. 4 or FIG. 5.

904. Perform frame searching processing on the self-defined frame to obtain frame header indication information.

If no frame header indication information is found, an LOF alarm and an OOF alarm are reported.

As shown in FIG. 8, FIG. 8 is a schematic diagram of a searching frame state machine for reporting an LOF alarm and an OOF alarm. In FIG. 8, OOF is out of frame.

When an OOF state lasts 3 ms, the LOF alarm is reported; and when an IF state lasts 3 ms, the LOF alarm is lifted.

Switch conditions for the state machine are as follows:

Condition 1: If frame header indication information of X consecutive frames is not correct, the state machine switches from an IF state to an OOF state, where a value of X is from 1 to 64, and a default value may be "5".

Condition 2: If frame header indication information of two consecutive frames is correct, the state machine switches from an OOF state to an IF state.

Condition 3: If all conditions except the condition 2 are met, the state machine stays in an OOF state.

Condition 4: If all conditions except the condition 1 are met, the state machine stays in an IF state.

905. According to the found frame header indication information, determine an overhead byte and a reserved byte, perform corresponding overhead processing, and delete the overhead byte and the reserved byte.

906. Modify at least one piece of frame header indication information into synchronization header indication information, and modify a corresponding character into K28.5.

It should be understood that, if a 64B/66B encoding manner is used as an example, a character of the at least one piece of frame header indication information is modified into /S/.

907. Encode an 8B code stream according to the modified synchronization header indication information to obtain a 10B code stream.

Specifically, a corresponding control character location and a data payload location are determined according to the synchronization header indication information. An 8B/10B code table is searched, and the 8B code stream is encoded and converted into the 10B code stream for transmission.

In this embodiment of the present invention, a first OTN device decodes a 10B code stream/a 66B code stream that is obtained by encoding service data to respectively obtain an 8B code stream/a 64B code stream, and inserts frame header indication information that is used to indicate a frame header location of the 8B code stream/the 64B code stream, so as to generate a self-defined frame that is transmitted by using 8B/64B code. A second OTN device demaps an ODU frame received from the first OTN device to obtain the self-defined frame, and encodes the self-defined frame to obtain 10B code/66 code again. In this way, between the two OTN devices, Overheads are peeled off, and the self-defined frame is directly mapped into a payload area for transmission, thereby avoiding a prior-art problem that efficiency is relatively low because redundant overheads are mapped. Therefore, a transmission bandwidth between the two OTN devices can be saved, and data transmission efficiency can be improved in this embodiment of the present invention.

In addition, in this embodiment of the present invention, timeslot division is performed based on a minimum granularity bandwidth of service data, so that a bandwidth can be fully utilized, and bandwidth utilization can be improved. In addition, a CPRI rate can be well configured, and mapping efficiency can be improved.

Figure 10:
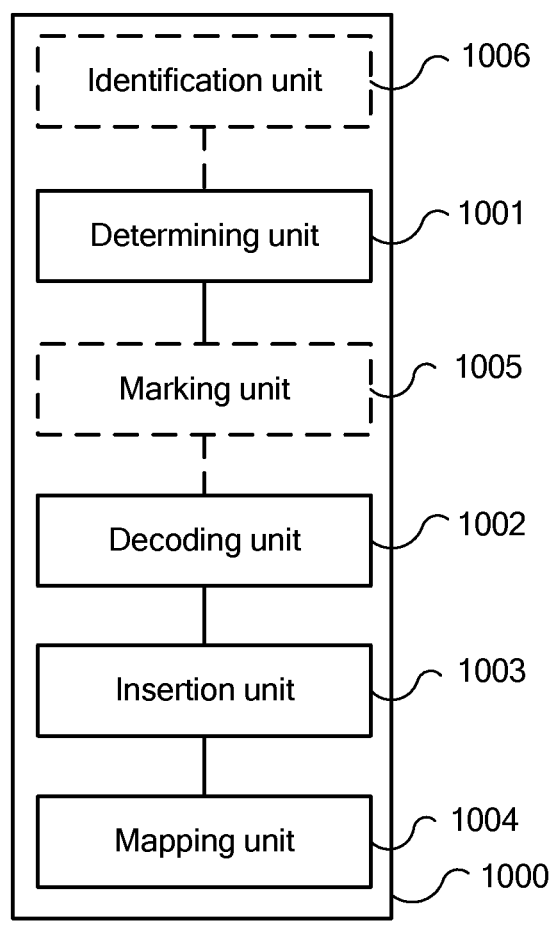
FIG. 10 is a schematic block diagram of a device according to an embodiment of the present invention.

FIG. 10 is a schematic block diagram of a device according to an embodiment of the present invention. The device shown in FIG. 10 may implement the methods in FIG. 4 and FIG. 5 and the process in FIG. 8. To avoid repetition, details are not described herein again. A device 1000 shown in FIG. 10 includes:

a determining unit 1001, configured to determine synchronization header indication information indicating a frame header location of a first code stream, where the first code stream is obtained by encoding common public radio interface CPRI service data;

a decoding unit 1002, configured to decode the first code stream to obtain a second code stream, where the first code stream is a 10B code stream, and the second code stream is an 8B code stream, or the first code stream is a 66B code stream, and the second code stream is a 64B code stream;

an insertion unit 1003, configured to insert frame header indication information indicating a frame header location of the second code stream into the second code stream according to the synchronization header indication information; and a mapping unit 1004, configured to map the second code stream and the frame header indication information into an optical channel payload unit OPU in an optical channel data unit ODU frame.

In this embodiment of the present invention, a 10B code stream/a 66B code stream obtained by encoding service data is decoded to respectively obtain an 8B code stream/a 64B code stream, and frame header indication information that is used to indicate a frame header location is inserted, so as to generate a self-defined frame that is transmitted by using 8B/64B code. Overheads are peeled off, and the self-defined frame is directly mapped into a payload area for transmission, thereby avoiding a prior-art problem that efficiency is relatively low because redundant overheads are mapped. Therefore, a transmission bandwidth can be saved, and data transmission efficiency can be improved in this embodiment of the present invention.

Optionally, in another embodiment, the mapping unit 1004 may perform timeslot division on the OPU based on a minimum granularity bandwidth of the CPRI service data to obtain at least one OPU timeslot; and map the second code stream and the frame header indication information into the at least one OPU timeslot.

In this embodiment of the present invention, timeslot division is performed based on a minimum granularity bandwidth of service data (for example, CPRI service data), so that a bandwidth can be fully utilized, and bandwidth utilization can be improved. In addition, a CPRI rate can be well configured, and mapping efficiency can be improved.

Optionally, in another embodiment, a bandwidth of the OPU timeslot is greater than or equal to 492.48 M.

Optionally, in another embodiment, the device 1000 further includes:

a marking unit 1005, configured to periodically mark the synchronization header indication information at the frame header location of the first code stream.

Optionally, in another embodiment, when the first code stream is a 10B code stream, and the second code stream is an 8B code stream, the device 1000 further includes:

an identification unit 1006, configured to identify a first code block with a character K28.5 in the first code stream.

The marking unit 1005 may mark the first code block as first synchronization header indication information.

The insertion unit 1003 may insert the frame header indication information into the second code stream before the first synchronization header indication information according to the first synchronization header indication information in the first code stream.

Optionally, in another embodiment, when the first code stream is a 66B code stream, and the second code stream is a 64B code stream, the identification unit 1006 may identify a second code block with a character /S/ in the first code stream.

The marking unit 1005 may mark the second code block as second synchronization header indication information.

The insertion unit 1003 may insert the frame header indication information into the second code stream before the second synchronization header indication information according to the second synchronization header indication information in the first code stream.

Optionally, in another embodiment, the insertion unit 1003 may further insert an overhead byte and/or a reserved byte into the second code stream; and the mapping unit 1004 may specifically map the second code stream, the frame header indication information, and the overhead byte and/or the reserved byte into the OPU in the ODU frame.

Optionally, in another embodiment, the at least one OPU timeslot corresponds to at least one piece of identification information. The mapping unit 1004 may determine first data corresponding to first identification information in the at least one piece of identification information in the second code stream and the frame header indication information according to the at least one piece of identification information; and map the first data into an OPU timeslot corresponding to the first identification information.

Optionally, in another embodiment, the at least one piece of identification information is indicated based on an overhead byte in the ODU frame.

In this embodiment of the present invention, a 10B code stream/a 66B code stream that is obtained after by encoding service data is decoded to respectively obtain an 8B code stream/a 64B code stream, and frame header indication information that is used to indicate a frame header location of the 8B code stream/the 64B code stream is inserted, so as to generate a self-defined frame that is transmitted by using 8B/64B code. Overheads are peeled off, and the self-defined frame is directly mapped into a payload area for transmission, thereby avoiding a prior-art problem that efficiency is relatively low because redundant overheads are mapped. Therefore, a transmission bandwidth can be saved, and data transmission efficiency can be improved in this embodiment of the present invention.

In addition, in this embodiment of the present invention, timeslot division is performed based on a minimum granularity bandwidth of service data, so that a bandwidth can be fully utilized, and bandwidth utilization can be improved. In addition, a CPRI rate can be well configured, and mapping efficiency can be improved.

Figure 11:
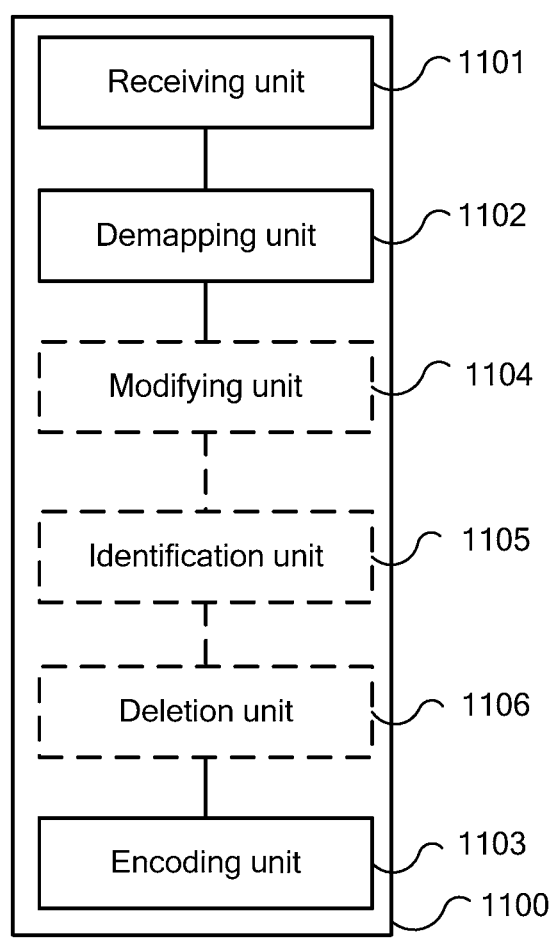
FIG. 11 is a schematic block diagram of a device according to another embodiment of the present invention.

FIG. 11 is a schematic block diagram of a device according to another embodiment of the present invention. The device shown in FIG. 11 may implement the method in FIG. 7 and the process in FIG. 9. To avoid repetition, details are not described herein again. A device 1100 shown in FIG. 11 includes:

a receiving unit 1101, configured to receive an optical channel data unit ODU frame from an optical transport network OTN device;

a demapping unit 1102, configured to demap an optical channel payload unit OPU in the ODU frame to obtain a second code stream and frame header indication information indicating a frame header location of the second code stream; and an encoding unit 1103, configured to encode the second code stream according to the frame header indication information to obtain a first code stream, where the first code stream is a 10B code stream, and the second code stream is an 8B code stream, or the first code stream is a 66B code stream, and the second code stream is a 64B code stream; and the first code stream is obtained by encoding common public radio interface CPRI service data.

In this embodiment of the present invention, a first OTN device decodes a 10B code stream/a 66B code stream that is obtained by encoding service data to respectively obtain an 8B code stream/a 64B code stream, and inserts frame header indication information that is used to indicate a frame header location of the 8B code stream/the 64B code stream, so as to generate a self-defined frame that is transmitted by using 8B/64B code. A second OTN device demaps an ODU frame received from the first OTN device to obtain the self-defined frame, and encodes the self-defined frame to obtain 10B code/66 code again. In this way, between the two OTN devices, Overheads are peeled off, and the self-defined frame is directly mapped into a payload area for transmission, thereby avoiding a prior-art problem that efficiency is relatively low because redundant overheads are mapped. Therefore, a transmission bandwidth between the two OTN devices can be saved, and data transmission efficiency can be improved in this embodiment of the present invention.

Optionally, in another embodiment, the OPU includes at least one OPU timeslot obtained by performing timeslot division based on a minimum granularity bandwidth of the CPRI service data.

In this embodiment of the present invention, timeslot division is performed based on a minimum granularity bandwidth of service data, so that a bandwidth can be fully utilized, and bandwidth utilization can be improved. In addition, a CPRI rate can be well configured, and mapping efficiency can be improved.

Optionally, in another embodiment, a bandwidth of the OPU timeslot is greater than or equal to 492.48 M.

Optionally, in another embodiment, the at least one OPU timeslot corresponds to at least one piece of identification information. The demapping unit 1102 may parse an overhead byte in the ODU frame to obtain a correspondence between the at least one piece of identification information and corresponding data; and parse an overhead byte of the OPU in the ODU frame, and obtain the second code stream and the frame header indication information according to the correspondence.

Optionally, in another embodiment, the at least one piece of identification information is indicated based on the overhead byte in the ODU frame.

Optionally, in another embodiment, the device 1100 further includes:

a modifying unit 1104, configured to modify, according to the frame header indication information, the frame header indication information into synchronization header indication information that is used to indicate a frame header location of the first code stream.

Optionally, in another embodiment, when the first code stream is a 10B code stream, and the second code stream is an 8B code stream, the modifying unit 1104 may further modify a character of the location indicated by the synchronization header indication information into K28.5 according to the synchronization header indication information.

Optionally, in another embodiment, when the first code stream is a 66B code stream, and the second code stream is a 64B code stream, the modifying unit 1104 may further modify a character of the location indicated by the synchronization header indication information into /S/ according to the synchronization header indication information.

Optionally, in another embodiment, the device 1100 further includes:

an identification unit 1105, configured to identify an overhead byte and/or a reserved byte in the second code stream according to the frame header indication information; and a deletion unit 1106, configured to delete the overhead byte and/or the reserved byte.

In this embodiment of the present invention, a first OTN device decodes a 10B code stream/a 66B code stream obtained by encoding service data to respectively obtain an 8B code stream/a 64B code stream, so as to generate a self-defined frame that is transmitted by using 8B/64B code. A second OTN device demaps an ODU frame received from the first OTN device to obtain the self-defined frame, and encodes the self-defined frame to obtain 10B code/66 code again. In this way, between the two OTN devices, Overheads are peeled off, and the self-defined frame is directly mapped into a payload area for transmission, thereby avoiding a prior-art problem that efficiency is relatively low because redundant overheads are mapped. Therefore, a transmission bandwidth between the two OTN devices can be saved, and data transmission efficiency can be improved in this embodiment of the present invention.

In addition, in this embodiment of the present invention, timeslot division is performed based on a minimum granularity bandwidth of service data, so that a bandwidth can be fully utilized, and bandwidth utilization can be improved. In addition, a CPRI rate can be well configured, and mapping efficiency can be improved.

Figure 12:
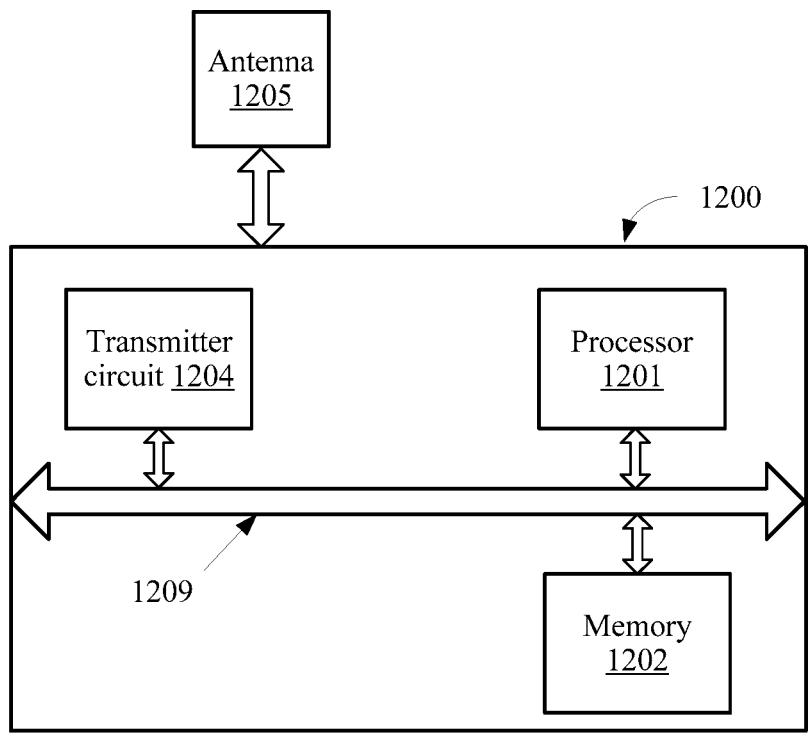
FIG. 12 is a schematic block diagram of a device according to another embodiment of the present invention.

FIG. 12 is a schematic block diagram of a device according to another embodiment of the present invention. A device 1200 in FIG. 12 may be configured to implement steps and methods in the foregoing method embodiments. The device 1200 in FIG. 12 includes a processor 1201, a memory 1202, and a transmitter circuit 1204. The processor 1201, the memory 1202, and the transmitter circuit 1204 are connected by using a bus system 1209.

In addition, the device 1200 may further include an antenna 1205, and the like. The processor 1201 controls operations of the device 1200. The memory 1202 may include a read-only memory and a random access memory, and provides an instruction and data for the processor 1201. All components of the device 1200 are coupled together by using the bus system 1209. In addition to a data bus, the bus system 1209 may include a power bus, a control bus, and a status signal bus. However, for clear description, various buses in the figure are marked as the bus system 1209.

The processor 1201 may be an integrated circuit chip and has a signal processing capability. The foregoing processor 1201 may be a general-purpose processor, a digital signal processor (DSP), an application-specific integrated circuit (ASIC), a field programmable gate array (FPGA) or another programmable logic device, a discrete gate, a transistor logic device, or a discrete hardware component. The processor 1201 may implement or execute methods, steps, and logic block diagrams that are disclosed in the embodiments of the present disclosure. The general-purpose processor may be a microprocessor, or the processor may be any conventional processor, or the like. The processor 1201 reads information from the memory 1202, and controls all the components of the device 1200 in combination with hardware of the processor 1201.

The methods in FIG. 4 and FIG. 5 may be implemented by the device 1200 in FIG. 12. To avoid repetition, details are not described again.

Specifically, the device 1200 completes the following operations under control of the processor 1201:

determining synchronization header indication information indicating a frame header location of a first code stream, where the first code stream is obtained by encoding common public radio interface CPRI service data;

decoding the first code stream to obtain a second code stream, where the first code stream is a 10B code stream, and the second code stream is an 8B code stream, or the first code stream is a 66B code stream, and the second code stream is a 64B code stream;

inserting frame header indication information indicating a frame header location of the second code stream into the second code stream according to the synchronization header indication information; and mapping the second code stream and the frame header indication information into an optical channel payload unit OPU in an optical channel data unit ODU frame.

In this embodiment of the present invention, a 10B code stream/a 66B code stream obtained by encoding service data is decoded to respectively obtain an 8B code stream/a 64B code stream, and frame header indication information that is used to indicate a frame header location is inserted, so as to generate a self-defined frame that is transmitted by using 8B/64B code. Overheads are peeled off, and the self-defined frame is directly mapped into a payload area for transmission, thereby avoiding a prior-art problem that efficiency is relatively low because redundant overheads are mapped. Therefore, a transmission bandwidth can be saved, and data transmission efficiency can be improved in this embodiment of the present invention.

Optionally, in another embodiment, the processor 1201 may perform timeslot division on the OPU based on a minimum granularity bandwidth of the CPRI service data to obtain at least one OPU timeslot; and map the second code stream and the frame header indication information into the at least one OPU timeslot.

In this embodiment of the present invention, timeslot division is performed based on a minimum granularity bandwidth of service data, so that a bandwidth can be fully utilized, and bandwidth utilization can be improved. In addition, a CPRI rate can be well configured, and mapping efficiency can be improved.

Optionally, in another embodiment, a bandwidth of the OPU timeslot is greater than or equal to 492.48 M.

Optionally, in another embodiment, before the decoding the first code stream, the processor 1201 may periodically mark the synchronization header indication information at a frame header location of a superframe of the first code stream.

Optionally, in another embodiment, when the first code stream is a 10B code stream, and the second code stream is an 8B code stream, the processor 1201 may identify a first code block with a character K28.5 in the first code stream; and mark a location of the first code block as first synchronization header indication information. The processor 1201 may insert the frame header indication information into the second code stream before the first synchronization header indication information according to the first synchronization header indication information in the first code stream.

Optionally, in another embodiment, when the first code stream is a 66B code stream, and the second code stream is a 64B code stream, the processor 1201 may identify a second code block with a character /S/ in the first code stream; and mark a location of the second code block as second synchronization header indication information. The processor 1201 may insert the frame header indication information into the second code stream before the second synchronization header indication information according to the second synchronization header indication information in the first code stream, so as to generate a self-defined frame.

Optionally, in another embodiment, the processor 1201 may further insert an overhead byte and/or a reserved byte into the second code stream. The processor 1201 may map the second code stream, the frame header indication information, and the overhead byte and/or the reserved byte into the OPU in the ODU frame.

Optionally, in another embodiment, the at least one OPU timeslot corresponds to at least one piece of identification information. The processor 1201 may determine first data corresponding to first identification information in the at least one piece of identification information in the second code stream and the frame header indication information according to the at least one piece of identification information; and map the first data into an OPU timeslot corresponding to the first identification information.

Optionally, in another embodiment, the at least one piece of identification information is indicated based on an overhead byte in the ODU frame.

Optionally, in another embodiment, the transmitter circuit 1204 may send a mapped ODU frame.

In this embodiment of the present invention, a 10B code stream/a 66B code stream obtained by encoding service data is decoded to respectively obtain an 8B code stream/a 64B code stream, so as to generate a self-defined frame that is transmitted by using 8B/64B code. Overheads are peeled off, and the self-defined frame is directly mapped into a payload area for transmission, thereby avoiding a prior-art problem that efficiency is relatively low because redundant overheads are mapped. Therefore, a transmission bandwidth can be saved, and data transmission efficiency can be improved in this embodiment of the present invention.

In addition, in this embodiment of the present invention, timeslot division is performed based on a minimum granularity bandwidth of service data, so that a bandwidth can be fully utilized, and bandwidth utilization can be improved. In addition, a CPRI rate can be well configured, and mapping efficiency can be improved.

Figure 13:
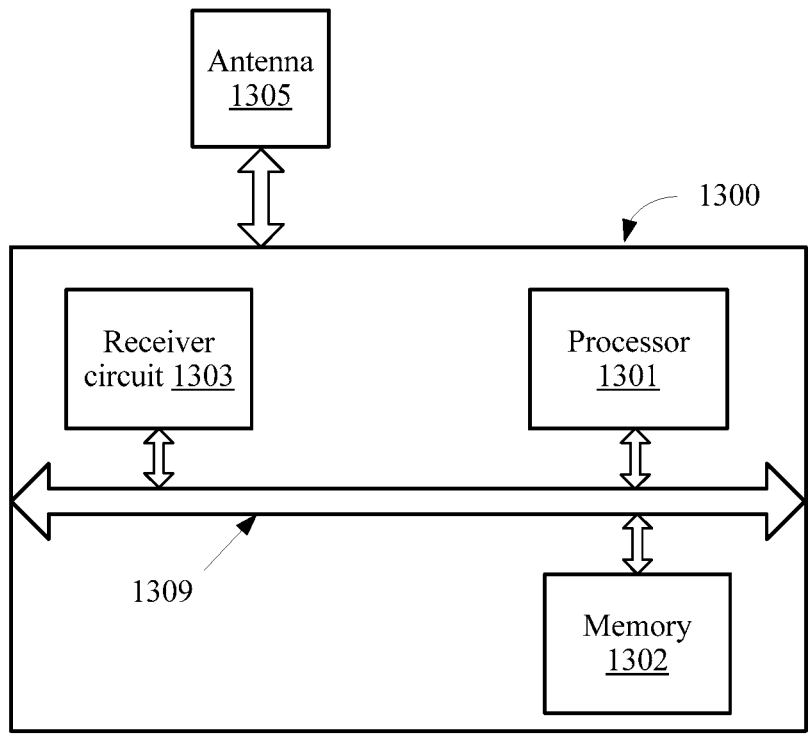
FIG. 13 is a schematic block diagram of a device according to another embodiment of the present invention.

FIG. 13 is a schematic block diagram of a device according to another embodiment of the present invention. A device 1300 in FIG. 13 may be configured to implement steps and methods in the foregoing method embodiments. The device 1300 in FIG. 13 includes a processor 1301, a memory 1302, and a receiver circuit 1303. The processor 1301, the memory 1302, and the receiver circuit 1303 are connected by using a bus system 1309.

In addition, the device 1300 may further include an antenna 1305, and the like. The processor 1301 controls operations of the device 1300. The memory 1302 may include a read-only memory and a random access memory, and provides an instruction and data for the processor 1301. All components of the device 1300 are coupled together by using the bus system 1309. In addition to a data bus, the bus system 1309 may include a power bus, a control bus, and a status signal bus. However, for clear description, various buses in the figure are marked as the bus system 1309.

The processor 1301 may be an integrated circuit chip and has a signal processing capability. The foregoing processor 1301 may be a general-purpose processor, a digital signal processor (DSP), an application-specific integrated circuit (ASIC), a field programmable gate array (FPGA) or another programmable logic device, a discrete gate, a transistor logic device, or a discrete hardware component. The processor 1301 may implement or execute methods, steps, and logic block diagrams that are disclosed in the embodiments of the present disclosure. The general-purpose processor may be a microprocessor, or the processor may be any conventional processor, or the like. The processor 1301 reads information from the memory 1302, and controls all the components of the device 1300 in combination with hardware of the processor 1301.

The method in FIG. 6 may be implemented by the device 1300 in FIG. 13. To avoid repetition, details are not described again.

Specifically, the device 1300 completes the following operations under control of the processor 1301:

receiving, by the receiver circuit 1303, an optical channel data unit ODU frame from an optical transport network OTN device;

demapping, by the processor 1301, an optical channel payload unit OPU in the ODU frame to obtain a second code stream and frame header indication information indicating a frame header location of the second code stream; and encoding the second code stream according to the frame header indication information to obtain a first code stream, where the first code stream is a 10B code stream, and the second code stream is an 8B code stream, or the first code stream is a 66B code stream, and the second code stream is a 64B code stream; and the first code stream is obtained by encoding common public radio interface CPRI service data.

In this embodiment of the present invention, a first OTN device decodes a 10B code stream/a 66B code stream that is obtained by encoding service data to respectively obtain an 8B code stream/a 64B code stream, and inserts frame header indication information that is used to indicate a frame header location of the 8B code stream/the 64B code stream, so as to generate a self-defined frame that is transmitted by using 8B/64B code. A second OTN device demaps an ODU frame received from the first OTN device to obtain the self-defined frame, and encodes the self-defined frame to obtain 10B code/66 code again. In this way, between the two OTN devices, Overheads are peeled off, and the self-defined frame is directly mapped into a payload area for transmission, thereby avoiding a prior-art problem that efficiency is relatively low because redundant overheads are mapped. Therefore, a transmission bandwidth between the two OTN devices can be saved, and data transmission efficiency can be improved in this embodiment of the present invention.

Optionally, in another embodiment, the OPU includes at least one OPU timeslot obtained by performing timeslot division based on a minimum granularity bandwidth of service data.

In this embodiment of the present invention, timeslot division is performed based on a minimum granularity bandwidth of service data, so that a bandwidth can be fully utilized, and bandwidth utilization can be improved. In addition, a CPRI rate can be well configured, and mapping efficiency can be improved.

Optionally, in another embodiment, a bandwidth of the OPU timeslot is greater than or equal to 492.48 M.

Optionally, in another embodiment, the at least one OPU timeslot corresponds to at least one piece of identification information. The processor 1301 may parse an overhead byte in the ODU frame to obtain a correspondence between the at least one piece of identification information and corresponding data; and parse an overhead byte of the OPU in the ODU frame, and obtain the second code stream and the frame header indication information according to the correspondence.

Optionally, in another embodiment, the at least one piece of identification information is indicated based on the overhead byte in the ODU frame.

Optionally, in another embodiment, the processor 1301 may modify, according to the frame header indication information, the frame header indication information into synchronization header indication information that is used to indicate a frame header location of the first code stream.

Optionally, in another embodiment, when the first code stream is a 10B code stream, and the second code stream is an 8B code stream, the processor 1301 may further modify a character of the location indicated by the synchronization header indication information into K28.5 according to the synchronization header indication information.

Optionally, in another embodiment, when the first code stream is a 66B code stream, and the second code stream is a 64B code stream, the processor 1301 may further modify a character of the location indicated by the synchronization header indication information into /S/ according to the synchronization header indication information.

Optionally, in another embodiment, the processor 1301 may identify an overhead byte and/or a reserved byte in the second code stream according to the frame header indication information; and delete the overhead byte and/or the reserved byte.

In this embodiment of the present invention, a first OTN device decodes a 10B code stream/a 66B code stream obtained by encoding service data to respectively obtain an 8B code stream/a 64B code stream, so as to generate a self-defined frame that is transmitted by using 8B/64B code. A second OTN device demaps an ODU frame received from the first OTN device to obtain the self-defined frame, and encodes the self-defined frame to obtain 10B code/66 code again. In this way, between the two OTN devices, Overheads are peeled off, and the self-defined frame is directly mapped into a payload area for transmission, thereby avoiding a prior-art problem that efficiency is relatively low because redundant overheads are mapped. Therefore, a transmission bandwidth between the two OTN devices can be saved, and data transmission efficiency can be improved in this embodiment of the present invention.

In addition, in this embodiment of the present invention, timeslot division is performed based on a minimum granularity bandwidth of service data, so that a bandwidth can be fully utilized, and bandwidth utilization can be improved. In addition, a CPRI rate can be well configured, and mapping efficiency can be improved.

It should be understood that "one embodiment" or "an embodiment" mentioned in the whole specification does not mean that particular features, structures, or characteristics related to the embodiment are included in at least one embodiment of the present invention. Therefore, "in one embodiment" or "in an embodiment" appearing throughout the specification does not refer to a same embodiment. In addition, these particular features, structures, or characteristics may be combined in one or more embodiments by using any appropriate manner. Sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of the present disclosure, "B corresponding to A" indicates that B is associated with A, and B may be determined according to A. However, it should further be understood that determining A according to B does not mean that B is determined according to A only; that is, B may also be determined according to A and/or other information.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments of the present disclosure.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

With descriptions of the foregoing implementations, a person skilled in the art may clearly understand that the present disclosure may be implemented by hardware, firmware or a combination thereof. When the present disclosure is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. In addition, any connection may be appropriately defined as a computer-readable medium.

In summary, what is described above is merely example embodiments of the technical solutions of the present disclosure, but is not intended to limit the protection scope of the present disclosure. Any modification, equivalent replacement, or improvement made without departing from the spirit and principle of the present disclosure shall fall within the protection scope of the present disclosure.

What is claimed is:

1. A data transmission method, comprising:
determining synchronization header indication information indicating a frame header location of a first code stream, wherein the first code stream is obtained by encoding common public radio interface (CPRI) service data;
decoding the first code stream to obtain a second code stream, wherein when the first code stream is a 10B code stream, the second code stream is an 8B code stream, and when the first code stream is a 66B code stream, the second code stream is a 64B code stream;
inserting frame header indication information indicating a frame header location of the second code stream into the second code stream according to the synchronization header indication information; and
mapping the second code stream and the frame header indication information into an optical channel payload unit (OPU) in an optical channel data unit (ODU) frame.

2. The method according to claim 1, wherein mapping the second code stream and the frame header indication information into an OPU in an ODU frame comprises:
performing timeslot division on the OPU based on a minimum granularity bandwidth of the CPRI service data to obtain at least one OPU timeslot; and
mapping the second code stream and the frame header indication information into the at least one OPU timeslot.

3. The method according to claim 2, wherein a bandwidth of the OPU timeslot is greater than or equal to 492.48 Mega bits.

4. The method according to claim 2, wherein the at least one OPU timeslot corresponds to at least one piece of identification information, and the mapping the second code stream and the frame header indication information into the at least one OPU timeslot comprises:
determining first data corresponding to first identification information in the at least one piece of identification information in the second code stream and the frame header indication information according to the at least one piece of identification information; and
mapping the first data into an OPU timeslot corresponding to the first identification information.

5. The method according to claim 1, wherein before decoding the first code stream, the method further comprises:
periodically marking the synchronization header indication information at the frame header location of the first code stream.

6. The method according to claim 5, wherein when the first code stream is a 10B code stream, and the second code stream is an 8B code stream, periodically marking the synchronization header indication information at the frame header location of the first code stream comprises:
identifying a first code block with a character K28.5 in the first code stream; and
marking a location of the first code block as first synchronization header indication information; and, wherein
inserting frame header indication information indicating a frame header location of the second code stream into the second code stream according to the synchronization header indication information comprises:
inserting the frame header indication information into the second code stream before the first synchronization header indication information according to the first synchronization header indication information in the first code stream.

7. The method according to claim 5, wherein when the first code stream is a 66B code stream, and the second code stream is a 64B code stream, periodically marking the synchronization header indication information at the frame header location of the first code stream comprises:
identifying a second code block with a character /S/ in the first code stream; and
marking a location of the second code block as second synchronization header indication information; and, wherein
inserting frame header indication information indicating a frame header location of the second code stream into the second code stream according to the synchronization header indication information comprises:
inserting the frame header indication information into the second code stream before the second synchronization header indication information according to the second synchronization header indication information in the first code stream.

8. The method according to claim 1, wherein the method further comprises:
inserting an overhead byte and/or a reserved byte into the second code stream; and, wherein
mapping the second code stream and the frame header indication information into an optical channel payload unit OPU in an optical channel data unit ODU frame comprises:
mapping the second code stream, the frame header indication information, and the overhead byte and/or the reserved byte into the OPU in the ODU frame.

9. A data transmission method, comprising:
receiving an optical channel data unit (ODU) frame from an optical transport network (OTN) device;
demapping an optical channel payload unit (OPU) in the ODU frame to obtain a second code stream and frame header indication information indicating a frame header location of the second code stream; and
encoding the second code stream according to the frame header indication information to obtain a first code stream, wherein when the first code stream is a 10B code stream, the second code stream is an 8B code stream, and when the first code stream is a 66B code stream, the second code stream is a 64B code stream, and wherein the first code stream is obtained by encoding common public radio interface (CPRI) service data.

10. The method according to claim 9, wherein the OPU comprises at least one OPU timeslot obtained by performing timeslot division based on a minimum granularity bandwidth of the CPRI service data.

11. The method according to claim 10, wherein the at least one OPU timeslot corresponds to at least one piece of identification information, and the demapping an optical channel payload unit OPU in the ODU frame to obtain a second code stream and frame header indication information indicating a frame header location of the second code stream comprises:

parsing an overhead byte in the ODU frame to obtain a correspondence between the at least one piece of identification information and corresponding data; and parsing an overhead byte of the OPU in the ODU frame, and obtaining the second code stream and the frame header indication information according to the correspondence.

12. The method according to claim 9, wherein before encoding the second code stream according to the frame header indication information to obtain a first code stream, the method further comprises:

modifying, according to the frame header indication information, the frame header indication information into synchronization header indication information indicating a frame header location of the first code stream.

13. The method according to claim 12, wherein when the first code stream is a 10B code stream, and the second code stream is an 8B code stream, the method further comprises:

modifying a character of the location indicated by the synchronization header indication information into K28.5 according to the synchronization header indication information.

14. The method according to claim 12, wherein when the first code stream is a 66B code stream, and the second code stream is a 64B code stream, the method further comprises:

modifying a character of the location indicated by the synchronization header indication information into /S/ according to the synchronization header indication information.

15. The method according to claim 9, wherein before the encoding the second code stream according to the frame header indication information to obtain a first code stream, the method further comprises:

identifying an overhead byte and/or a reserved byte in the second code stream according to the frame header indication information; and deleting the overhead byte and/or the reserved byte.

16. A device, comprising a processor, configured to:

determine synchronization header indication information indicating a frame header location of a first code stream, wherein the first code stream is obtained by encoding common public radio interface (CPRI) service data;

decode the first code stream to obtain a second code stream, wherein when the first code stream is a 10B code stream, the second code stream is an 8B code stream, and when the first code stream is a 66B code stream, the second code stream is a 64B code stream;

insert frame header indication information indicating a frame header location of the second code stream into the second code stream according to the synchronization header indication information; and map the second code stream and the frame header indication information into an optical channel payload unit (OPU) in an optical channel data unit (ODU) frame.

17. The device according to claim 16, wherein the processor is specifically configured to:

perform timeslot division on the OPU based on a minimum granularity bandwidth of the CPRI service data to obtain at least one OPU timeslot; and map the second code stream and the frame header indication information into the at least one OPU timeslot.

18. The device according to claim 17, wherein a bandwidth of the OPU timeslot is greater than or equal to 492.48 Mega bits.

19. The device according to claim 17, wherein the at least one OPU timeslot corresponds to at least one piece of identification information, and the processor is specifically configured to:

determine first data corresponding to first identification information in the at least one piece of identification information in the second code stream and the frame header indication information according to the at least one piece of identification information; and map the first data into an OPU timeslot corresponding to the first identification information.

20. The device according to claim 16, wherein the processor is further configured to periodically mark the synchronization header indication information at the frame header location of the first code stream.

21. The device according to claim 20, wherein when the first code stream is a 10B code stream, and the second code stream is an 8B code stream, the processor is configured to:

identify a first code block with a character K28.5 in the first code stream;

mark a location of the first code block as first synchronization header indication information; and insert the frame header indication information into the second code stream before the first synchronization header indication information according to the first synchronization header indication information in the first code stream.

22. The device according to claim 20, wherein when the first code stream is a 66B code stream, and the second code stream is a 64B code stream, the processor is configured to:

identify a second code block with a character /S/ in the first code stream;

mark a location of the second code block as second synchronization header indication information; and insert the frame header indication information into the second code stream before the second synchronization header indication information according to the second synchronization header indication information in the first code stream.

23. The device according to claim 16, wherein the processor is further configured to insert an overhead byte and/or a reserved byte into the second code stream; and the processor is configured to map the second code stream, the frame header indication information, and the overhead byte and/or the reserved byte into the OPU in the ODU frame.

* * * * *